United States Patent
Nishi

(10) Patent No.: US 7,319,644 B2
(45) Date of Patent: *Jan. 15, 2008

(54) OPTICAL HEAD, LIGHT-EMITTING/RECEIVING DEVICE, AND APPARATUS FOR RECORDING/REPRODUCING OPTICAL RECORDING/RECORDED MEDIUM

(75) Inventor: Noriaki Nishi, Tokyo (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/494,565

(22) Filed: Jul. 28, 2006

(65) Prior Publication Data

US 2006/0262700 A1 Nov. 23, 2006

Related U.S. Application Data

(63) Continuation of application No. 11/124,071, filed on May 9, 2005, now Pat. No. 7,095,687, which is a continuation of application No. 09/914,350, filed on Dec. 21, 2001, now Pat. No. 6,940,789.

(51) Int. Cl.
*G11B 7/085* (2006.01)

(52) U.S. Cl. .................. 369/44.42; 369/47.37

(58) Field of Classification Search ............. 369/44.42, 369/47.37
See application file for complete search history.

(56) References Cited

U.S. PATENT DOCUMENTS

| | | | |
|---|---|---|---|
| 5,687,152 A | | 11/1997 | Takeda et al. |
| 5,835,471 A | * | 11/1998 | Miyamoto et al. ...... 369/112.07 |
| 5,974,011 A | * | 10/1999 | Nakane .................... 369/47.52 |
| 6,004,487 A | * | 12/1999 | Wada et al. ................ 264/1.33 |
| 6,940,789 B2 | | 9/2005 | Nishi |

FOREIGN PATENT DOCUMENTS

| | | |
|---|---|---|
| EP | 658 884 A-1 | 6/1995 |
| JP | 60-229007 | 11/1985 |
| JP | 1-179235 | 7/1989 |
| JP | 2-258240 | 10/1989 |
| JP | 05-258339 | 10/1993 |
| JP | 09 265638 | 10/1997 |
| JP | 10-124923 | 5/1998 |
| JP | 11-25502 | 1/1999 |
| JP | 1-78442 | 3/1999 |
| JP | 11-134677 | 5/1999 |
| JP | 2001-76359 | 3/2001 |
| JP | 2001-93167 | 4/2001 |

OTHER PUBLICATIONS

International Search Report, Apr. 24, 2001.
EPO Supplemental Search Report, Nov. 4, 2002.

* cited by examiner

*Primary Examiner*—Gautam R. Patel
(74) *Attorney, Agent, or Firm*—Rader Fishman & Grauer PLLC; Ronald P. Kananen

(57) ABSTRACT

An optical head in which focusing error is detected by a spot size method used for recording and/or reproducing information signals on or from an optical disc. The optical head includes a unit for correcting the spot shape between the objective lens and a photodetector device. The spot shape correcting unit corrects part or all of light spots formed on the photodetector by a light beam reflected back by the optical disc so that the spot diameter in a direction traversing a track on the optical disc will be larger than the spot diameter along the track.

22 Claims, 17 Drawing Sheets

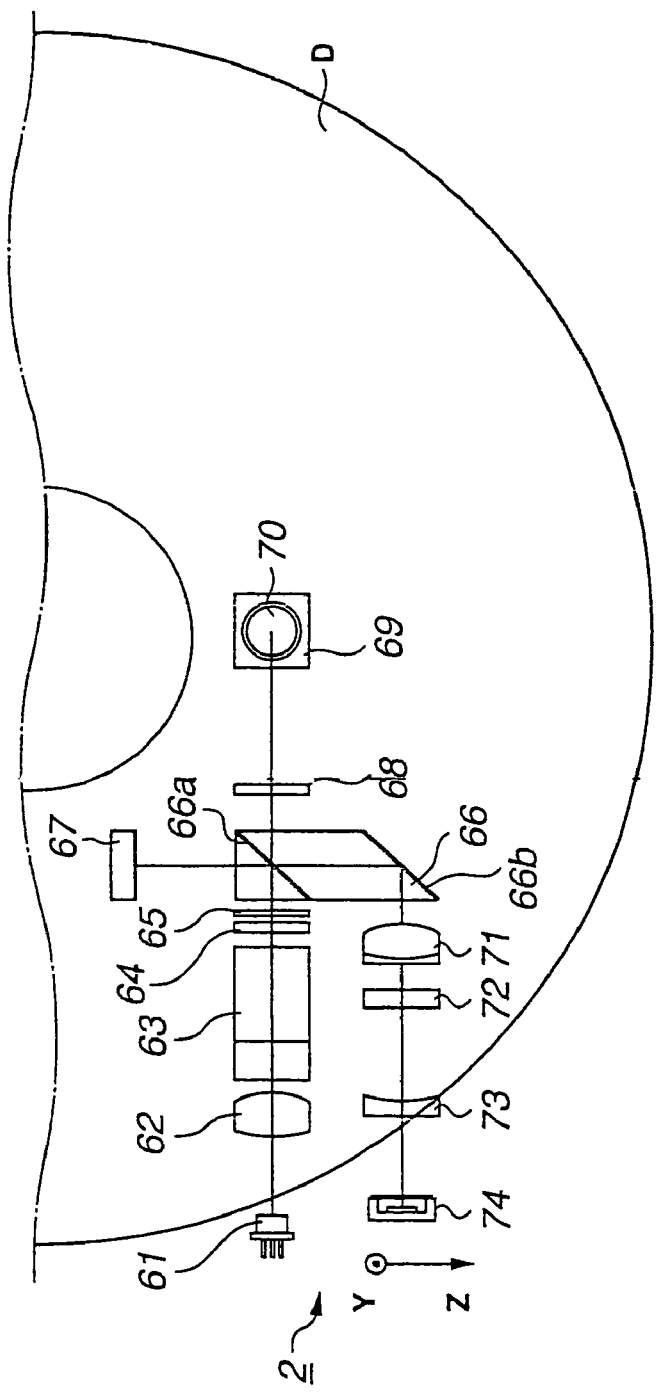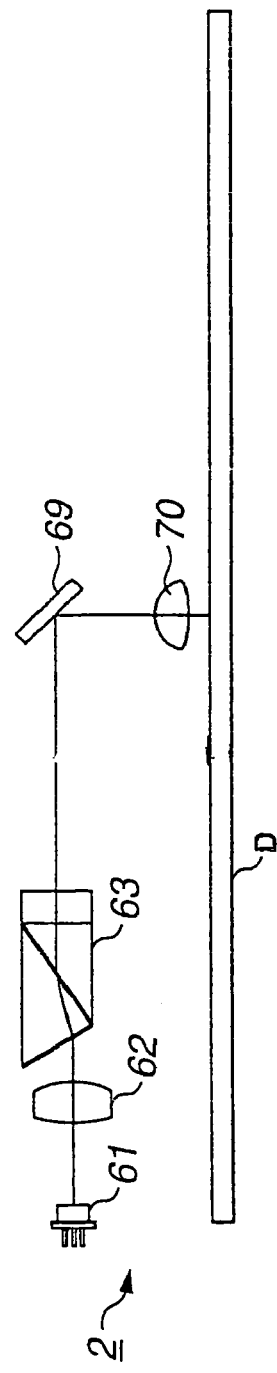
FIG.6A
FIG.6B

FIG.9A  FIG.9B

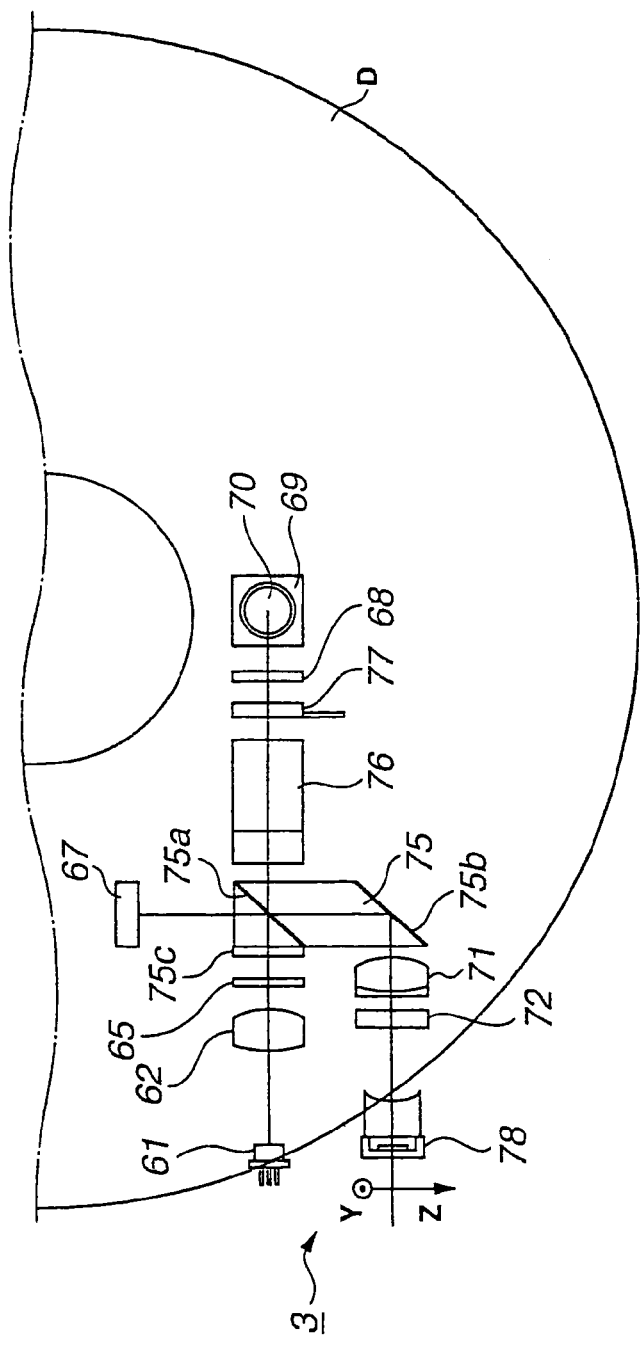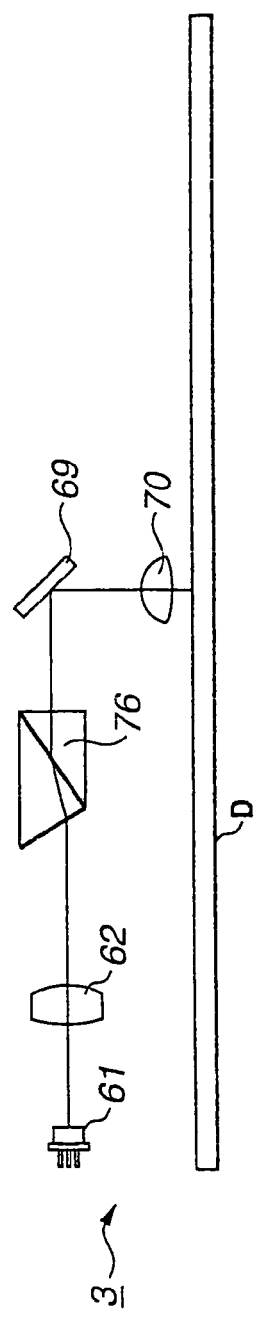
FIG.12A
FIG.12B

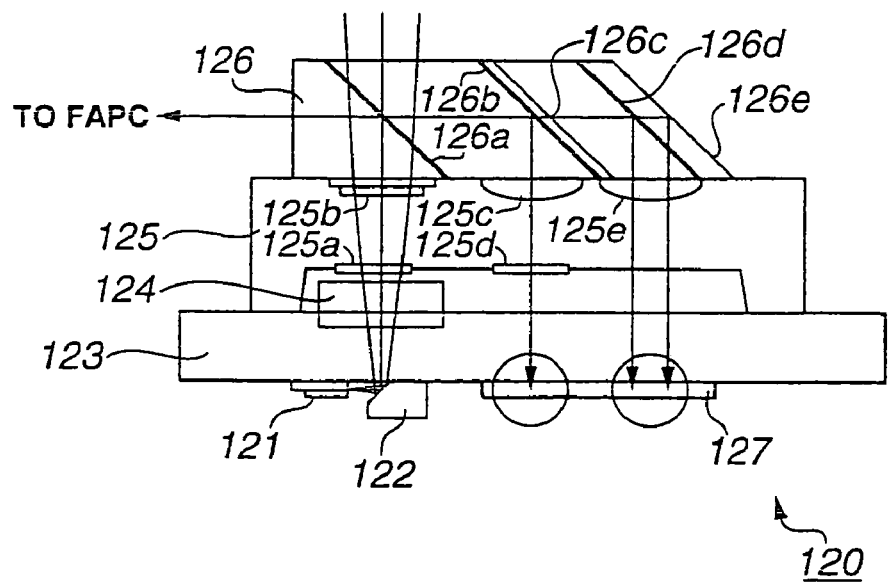
FIG.21A
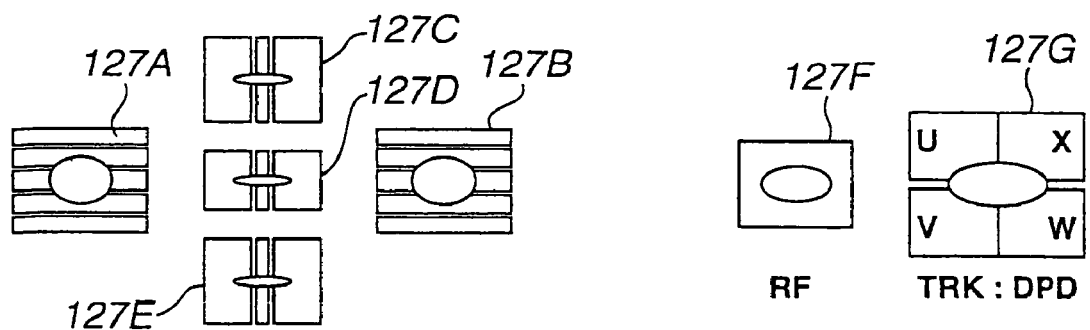
FIG.21B  FIG.21C

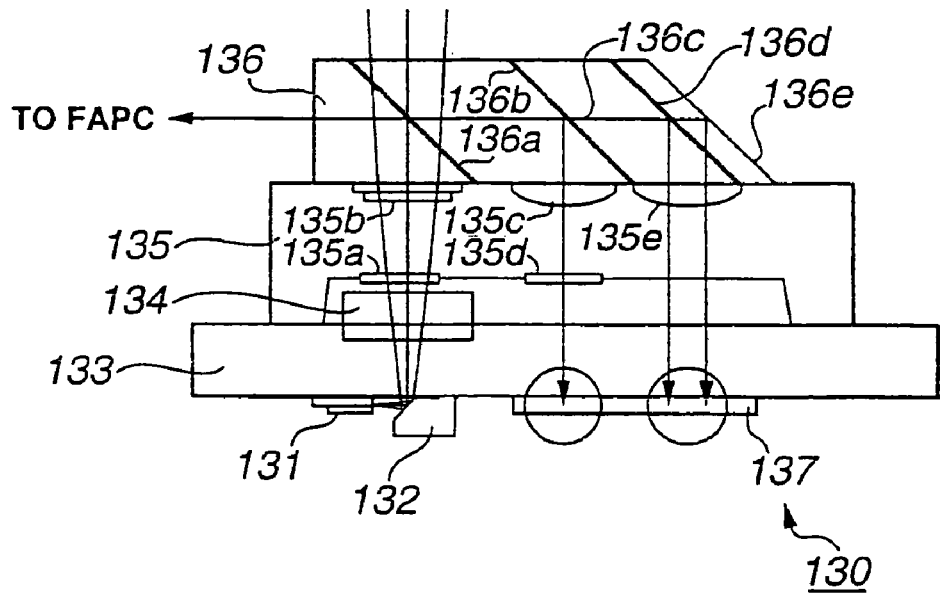
FIG.22A
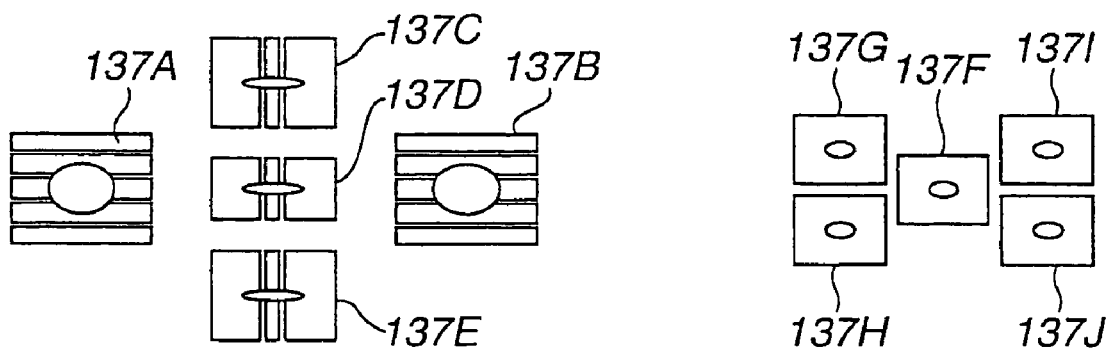
FIG.22B
FIG.22C

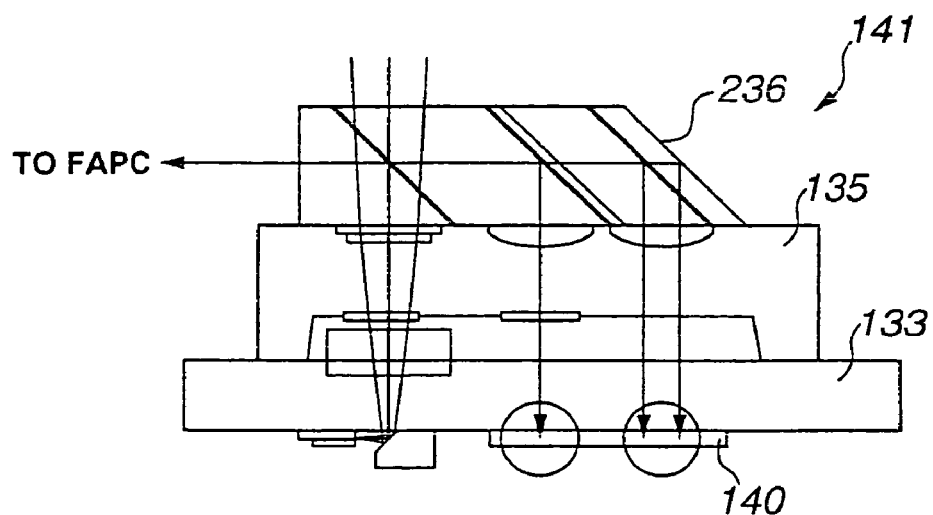
FIG.24A
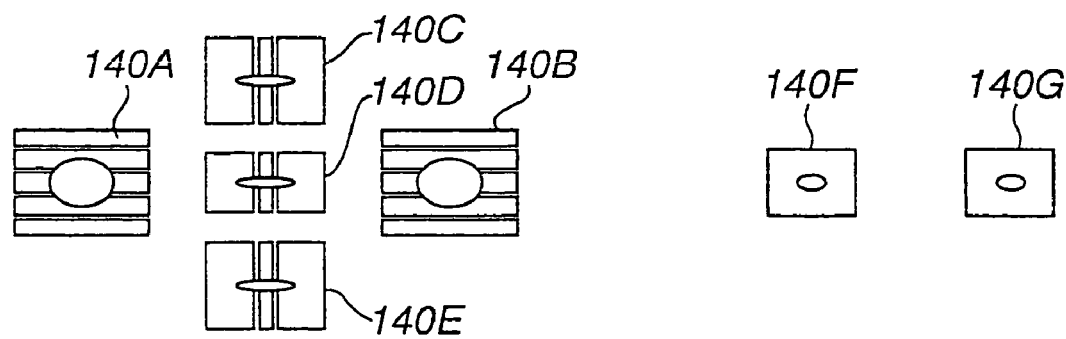
FIG.24B      FIG.24C

OPTICAL HEAD, LIGHT-EMITTING/RECEIVING DEVICE, AND APPARATUS FOR RECORDING/REPRODUCING OPTICAL RECORDING/RECORDED MEDIUM

RELATED APPLICATIONS

This application is a continuation application of application Ser. No. 11/124,071, filed on May 9, 2005, now U.S. Pat. No. 7,095,687 which is a continuation application of application Ser. No. 09/914,350, filed on Dec. 21, 2001, now U.S. Pat. No. 6,940,789, the entire contents of which are being incorporated herein by reference. The present application claims priority based on Japanese Patent Application No. 11-370554, filed on Dec. 27, 1999, and on Japanese Patent Application No. 2000-349227, filed on Nov. 16, 2000, the entirety of which being incorporated herein by reference.

TECHNICAL FIELD

This invention relates to an optical recording and/or reproducing apparatus, such as an optical disc apparatus recording and/or reproducing information signals, using an optical recording medium, such as an optical disc, an optical bead used in the optical recording and/or reproducing apparatus, and to a light receiving/emitting device used in the optical head.

BACKGROUND ART

A wide variety of optical information recording and/or reproducing apparatus optically recording and/or reproducing the information, using an optical information recording medium, such as an optical disc, are currently in use. In particular, the recording and/or reproducing apparatus for an optical recording medium, employing the optical disc as the recording medium, is used extensively and researches into a higher recording density of the optical disc are now underway.

For example, as a replay-only optical recording and/or reproducing apparatus, such an optical disc apparatus, is now in use, which, with the use of a DVD (digital versatile disc) as a disc, allows for replay having a recording capacity as high as 4.7 GB equal to approximately seven times that of a CD-ROM, with the recording capacity of approximately 650 MB, even though the DVD is of the same diameter of 120 mm as that of a CD-ROM.

In general, an optical disc has a recording surface on a transparent substrate, and permits recording and/or reproduction of information signals by a light beam for recording and/or reproduction being illuminated through an objective lens on an optical disc and being transmitted through the transparent substrate so as to be converged on the recording surface of the disc.

On the recording surface of the optical disc, there are formed track-guiding grooves and lands for a light beam to correctly scan the recording track, these grooves or lands being used to detect tracking errors. A pit string, formed on the recording track, can also be handled as intermittent grooves or lands.

In addition to the aforementioned optical discs, the DVD-RAM, which can be rewritten freely, is in use, so that a demand is raised for a reproducing head for a DVD enabling this DVD-RAM to be reproduced and for a recording and/or reproducing optical head for a DVD-RAM enabling the DVD and the compact disc (CD) to be reproduced.

Meanwhile, in a conventional replay-only DVD or CD, or in a magneto-optical disc, the recording system used is such a one in which the information is recorded in only one of the land and the groove. On the other hand, with the DVD-RAM, the land-groove recording system of recording the information in both the land and the groove is used, with a view to elevating the recording density. In addition, a variety of recording media, employing the land and groove recording system, has been proposed as a system for realization of the high density recording. The optical recording medium of this land-groove recording system affords certain broader widths to both the land and the groove, in distinction from the conventional magneto-optical disc in which the one of the land and the groove used for recording is of a broader width, with the other of the land and the groove being narrower in width.

However, in a optical recording medium of recording information signals by the land and groove recording system, it has been ascertained that the phenomenon termed "tracking interference" as later explained occurs in case of employing the aforementioned astigmatic method for detecting the focusing errors, thus giving rise to a noise termed "track traversing noise".

This "tracking interference" is a phenomenon in which focusing error signals undergo significant changes in the focusing error signals when a beam spot traverses. a track. The "track traversing noise" is a noise produced by the focusing error signals assuming different values depending on whether the beam spot is on the land or on the groove of the recording medium.

Referring to FIG. 1, the aforementioned "tracking interference" is elucidated by referring to FIG. 1.

Referring to FIG. 1, the abscissa and the ordinate denote object lens positions in a direction perpendicular to the disc, and an output level of the focusing error signals. A curve FEL, indicated buy a solid line, is a focusing error curve showing the relation between the objective lens position and the focusing error signals FE with the beam spot lying on the land of the optical disc, whilst a curve FEG, indicated by a broken line, is a focusing error curve showing the relation between the objective lens position and the focusing error signals FE with the beam spot lying on the groove of the optical disc.

Referring further to FIG. 1, a peak-to-peak range of the focusing error curve FEL (FEG) is defined as a focusing pull-in range Spp. It is within this range only that focusing servo occurs. The reason this focusing pull-in range Spp is provided and focusing servo is made to occur only in this range is that, since the focusing error signals may be zero even when the objective lens position is shifted appreciably from the focusing position, it is necessary to evade the defocused state being detected as being the focused state.

Still referring to FIG. 1, the focusing error signals FE in the focusing pull-in range Spp assume. different values, depending on whether the beam spot is on the land or on the groove of the optical disc. Therefore, there are two positions of the zero focusing error signals FE, namely a position corresponding to the objective lens position XL when the beam spot is on the land and a position corresponding to the objective lens position XG when the beam spot is on the groove.

On the other hand, a controller for controlling the optical head operation controls the current supplied to a lens driving coil, and drives the objective lens along its optical axis so that the focusing error signals FE will be zero. Therefore, each time a beam spot is moved from the land to the groove on the optical disc, or vice versa, the objective lens is reciprocated between the positions XL and XG, thus producing the track traversing noise. This noise is responsible for a variety of inconveniences, such as defocusing, worsened transmission characteristics in the focusing or tracking servo, or scorching or destruction of the lens driving coil.

Meanwhile, the mechanism responsible for the tracking interference phenomenon, as explained with reference to FIG. 1, has not been analyzed sufficiently to date.

For alleviating the inconvenience, brought about by the tracking interference phenomenon, it may be contemplated to detect focusing errors using the so-called spot size method.

That is, the aforementioned astigmatic method produces a signal corresponding to the shape of a received light spot by summation and subtraction of output signals from respective photodetector segments, whilst the spot size method detects the spot size by the output signals of light receiving sections to perform focusing servo control based on the spot size.

There is also a differential push-pull method as a system for producing tracking error signals in stability. In this case, however, three light spots are used as beam spots converged on the recording medium.

If the land-groove recording system is used, such a structure is desirable which is based on detection of a land-groove decision signal used for verifying on which of a track on a land and a track in a groove the light beam is converged. That is, it may be extremely difficult to realize a simplified structure that is based on detection of the focusing error signals or the land-groove decision signal in the differential push-pull method and on detection of the focusing error signals by the spot size method.

DISCLOSURE OF THE INVENTION

It is therefore an object of the present invention to provide a novel optical head free of the aforementioned problems of the prior art, a light receiving/emitting device used in this optical head and an optical recording medium recording and/or reproducing apparatus employing the optical head.

It is another object of the present invention to provide an optical head that is able to realize focusing error detection by the spot size method by a simplified structure, a light receiving/emitting device used in the optical head and an optical recording and/or reproducing apparatus employing the optical head.

In one aspect, the present invention provides an optical head including an objective lens supported for movement, a light source for radiating a light beam, light separating means for separating the light beam radiated from the light source and a reflected light beam from the optical recording medium from each other, light detecting means for receiving a reflected light beam from the optical recording medium separated by the light separating means and spot shape correction means arranged between the objective lens and the light detecting means. The spot shape correction means corrects part or all of the spots formed by the reflected light beam on the light detection means so that the spot diameter in a direction of traversing a track on the optical recording medium will be larger than the spot diameter in a direction along the track.

In another aspect, the present invention provides a recording and/or reproducing apparatus for an optical recording medium including means for rotationally driving an optical recording medium, an optical head for illuminating light via an objective lens supported for movement relative to a rotating optical recording medium and for detecting a light beam reflected from a signal recording surface of the optical recording medium through the objective lens by light detection means, a signal processing circuit for generating playback signals based on detection signals from the light detecting means, and a servo circuit for causing movement of the objective lens based on the detection signals from the light detecting means, in which the optical head includes a light source for radiating a light beam, light separating means for separating the light beam radiated from the light source and a reflected light beam from the optical recording medium from each other, light detecting means for receiving a reflected light beam from the optical recording medium separated by the light separating means and spot shape correction means arranged between the objective lens and the light detecting means for correcting part or all of the spots formed by the reflected light beam on the light detection means so that the spot diameter in a direction of traversing a track on the optical recording medium will be larger than the spot diameter in a direction along the track.

In the optical head of the present invention, in which spot shape correction means for correcting the spot shape of the reflected light beam is provided between the objective lens and the light detecting means to correct the spot shape of part or all of the spots formed by the reflected light beam on the photodetector means, no branching prism is required, while only one light detecting means suffices, with the result that the number of component parts and adjustment steps can be diminished and the adjustment process for the light detecting means may be simplified, while the reduction in size and cost may be achieved. Thus, reduction in the number of component parts or adjustment steps, reduction in size and cost of the optical head and stabilized characteristics are also realized even when the spot size method is used in the discrete optical system.

Moreover, with the present invention, stable signal detection may be achieved, without producing marked offset in the push-pull signals even when position shift has occurred between the light receiving sections on the photodetector and the spot due to variations in the assembling tolerance. The result is that an optical arrangement, which permits facilitated spot division or separation may be achieved without using strict manufacturing precision for component parts or assembling accuracy to an extent more than is necessary, thereby allowing to furnish a light receiving/emitting device small in size and cost and having stabilized characteristics.

Other objects, features and advantages of the present invention will become apparent from the following description of preferred embodiments thereof and the claims.

BRIEF DESCRIPTION OF THE DRAWINGS

FIG. 6A is a plan view showing another embodiment of an optical head according to the present invention.

FIG. 6B is a side view thereof.

FIGS. 9A to 9C are illustrative views showing exemplary control of respective beam spots by a hologram element used in the photodetector devices shown in FIGS. 7 and 8, respectively.

FIG. 12A is a plan view showing a further embodiment of an optical head according to the present invention.

FIG. 12B is a plan view thereof.

FIG. 21A is a side view showing a further embodiment of the light receiving/emitting device according to the present invention.

FIGS. 21B, 21C are plan views showing a light receiving segment of the photodetector device used in the light receiving/emitting device.

FIG. 22A is a side view showing a further embodiment of the light receiving/emitting device according to the present invention.

FIGS. 22B, 22C are plan views showing a light receiving segment of the photodetector device used in the light receiving/emitting device.

FIG. 24A is a side view showing a further embodiment of the light receiving/emitting device according to the present invention.

FIGS. 24B, 24C are plan views showing a light receiving segment of the photodetector device used in the light receiving/emitting device.

BEST MODE FOR CARRYING OUT THE INVENTION

Figure 1:
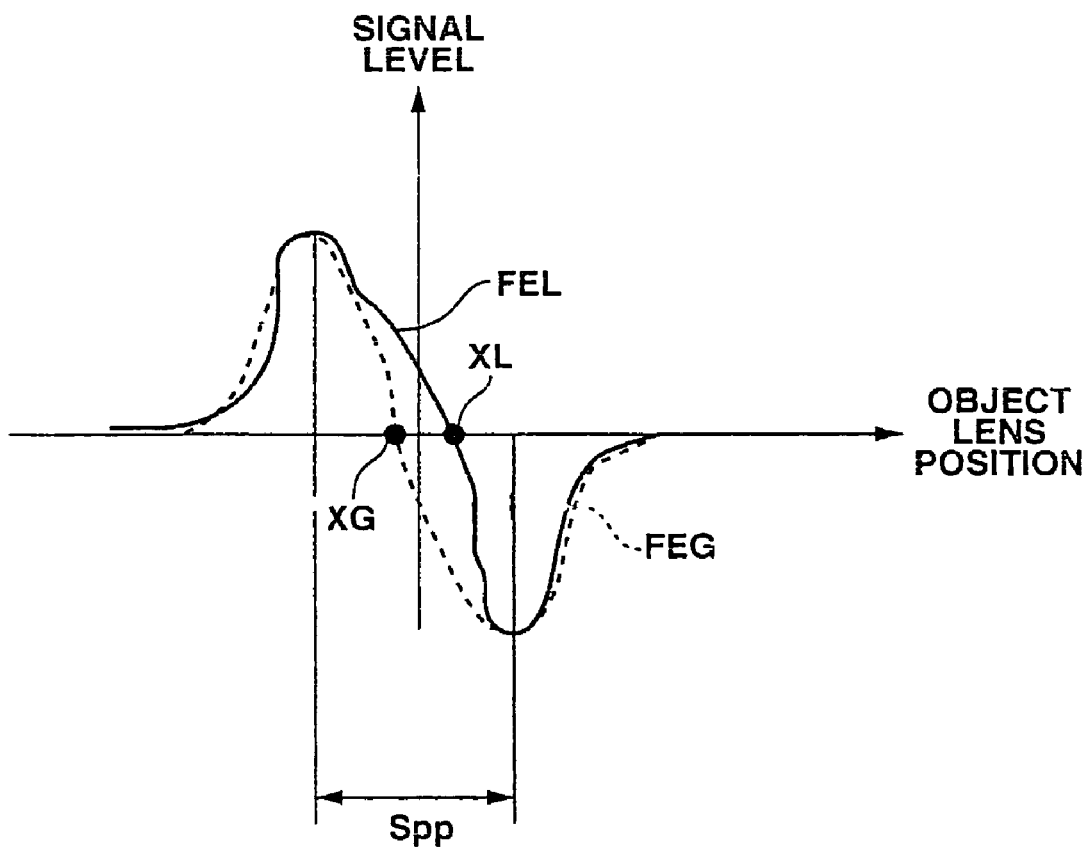
FIG. 1 is a graph for elucidating the tracking interference phenomenon in an optical recording and/or reproducing apparatus.

Referring to the drawings, an optical head according to the present invention, a light receiving/emitting device used on this optical head and an optical recording medium recording and/or reproducing apparatus employing the optical head according to the present invention will be explained in detail.

Figure 2:
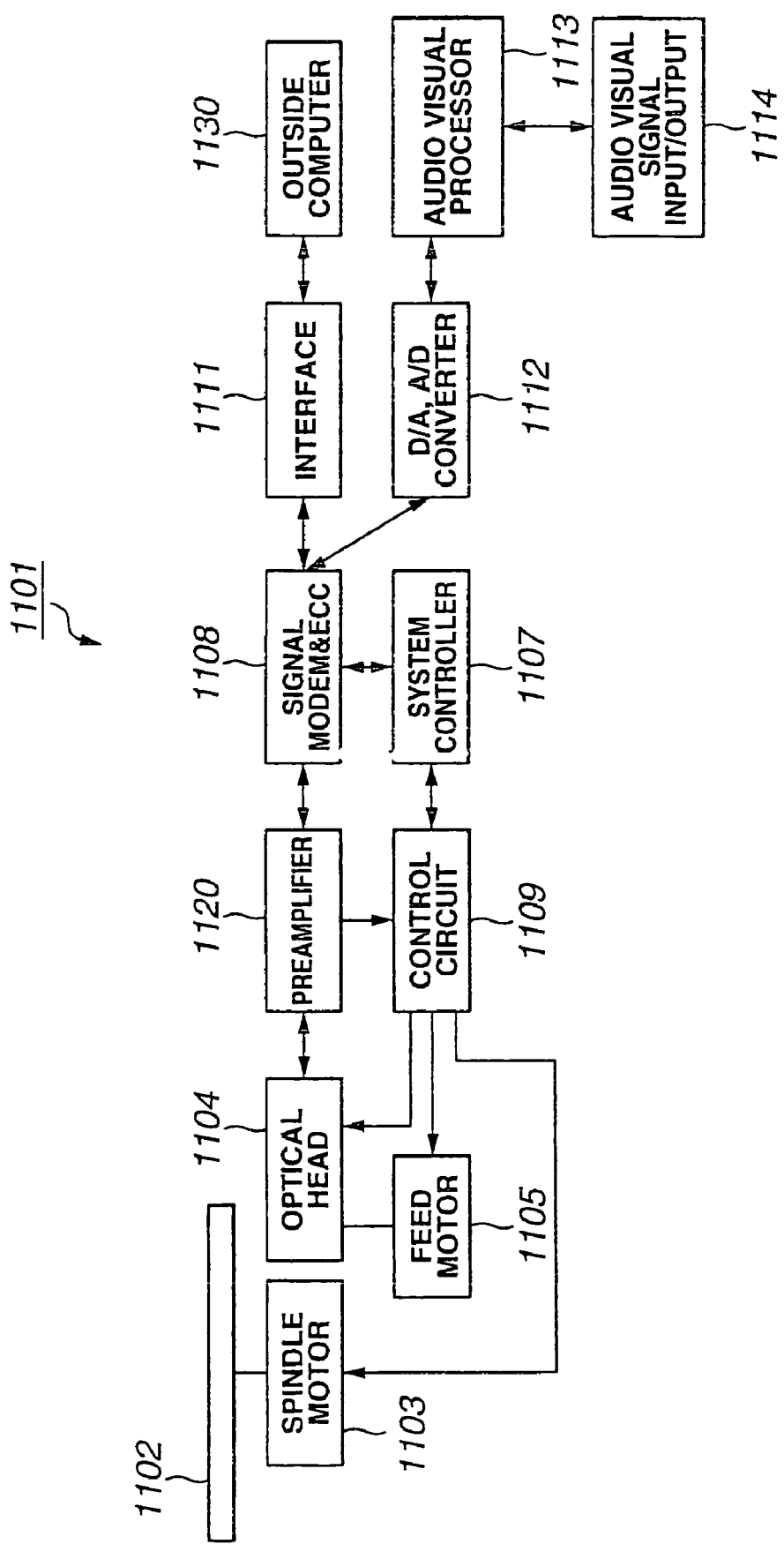
FIG. 2 is a block diagram showing a light receiving/emitting device and an optical recording medium recording and/or reproducing apparatus having built therein an optical head employing the light receiving/emitting device.

FIG. 2 is a block diagram of an optical disc recording and/or reproducing apparatus employing, as a recording medium, an optical head having a built-in optical head employing a light receiving/emitting device according to the present invention.

The optical disc recording and/or reproducing apparatus shown in FIG. 2 is a as typical optical recording medium recording and/or reproducing apparatus capable of loading thereon a light receiving/emitting device according to the present invention as later explained and an optical head employing this light receiving/emitting device. In the following description, it is assumed that the optical recording medium recording and/or reproducing apparatus is applicable to both the light receiving/emitting devices and to optical heads hereinafter explained.

An optical disc recording and/or reproducing apparatus 1101, embodying the present invention, includes a spindle motor 1103, as driving means for rotationally driving an optical disc 1102, an optical head 1104, and a feed motor 1105 as driving means for the optical head 1104.

The spindle motor 1103 is rotationally driven at a pre-set rpm under control by a system controller 1107 and a servo control circuit 1109.

Although the optical disc 1102 may use a replay-only optical disc, having recorded thereon information signals as a pattern of consecutive crests and recesses, it is more effective to use CD-R/RW, DVD-R, DVD-RAM, DVD-R/RW or DVD+RW, as recording and/or reproducing disc employing optical modulation recording, or DVR-BLUE, as high density optical disc employing a short wavelength light source with the wavelength in the vicinity of 405 nm.

A signal modem ECC block 1108 modulates/demodulates signals and appends error correction codes (ECC). The optical head 1104 illuminates light on a signal recording surface of the optical disc 1102 rotated under command from the signal modem ECC block 1108. This light illumination records and/or reproduces information signals on or from the optical disc 1102.

The optical head 1104 detects various light beams, as later explained, based on a reflected light beam from the signal recording surface of the optical disc 1102, and furnishes signals corresponding to the respective light beams to a pre-amplifier 1120.

The pre-amplifier 1120 is adapted for generating focusing error signals, tracking error signals and RF signals, based on signals associated with the respective light beams. Based on these signals, the servo control circuit 1109 and the signal modem ECC block 1108 perform pre-set processing operations, such as demodulation and error correction processing, depending on the sorts of the recording mediums to be reproduced.

The resulting demodulated signals are sent out via e.g., a data storage interface 1111 of a computer to e.g., an external computer 1130. Thus, the external computer 1130 is able to receive signals recorded on the optical disc 1102 as playback signals.

If for audio/visual use, the demodulated recording signals are D/A converted by a D/A converting section of a D/A and A/D converter 1112 and then sent to e.g., an audio/visual processor 1113. This audio/visual processor 1113 processes audio/visual signals to route the processed signals via an audio/visual signal input/out unit 1114.

The optical head 1104 used in the optical disc recording and/or reproducing apparatus is moved radially of the optical disc 1102, by a feed motor 1105, up to a pre-set recording track on the optical disc 1102. The servo control circuit 1109 takes charge of control of the spindle motor 1103 and of the feed motor 1105 and control in the focusing and tracking directions of a bi-axial actuator holding an objective lens of the optical head 1104.

Figures 3A, 3B:
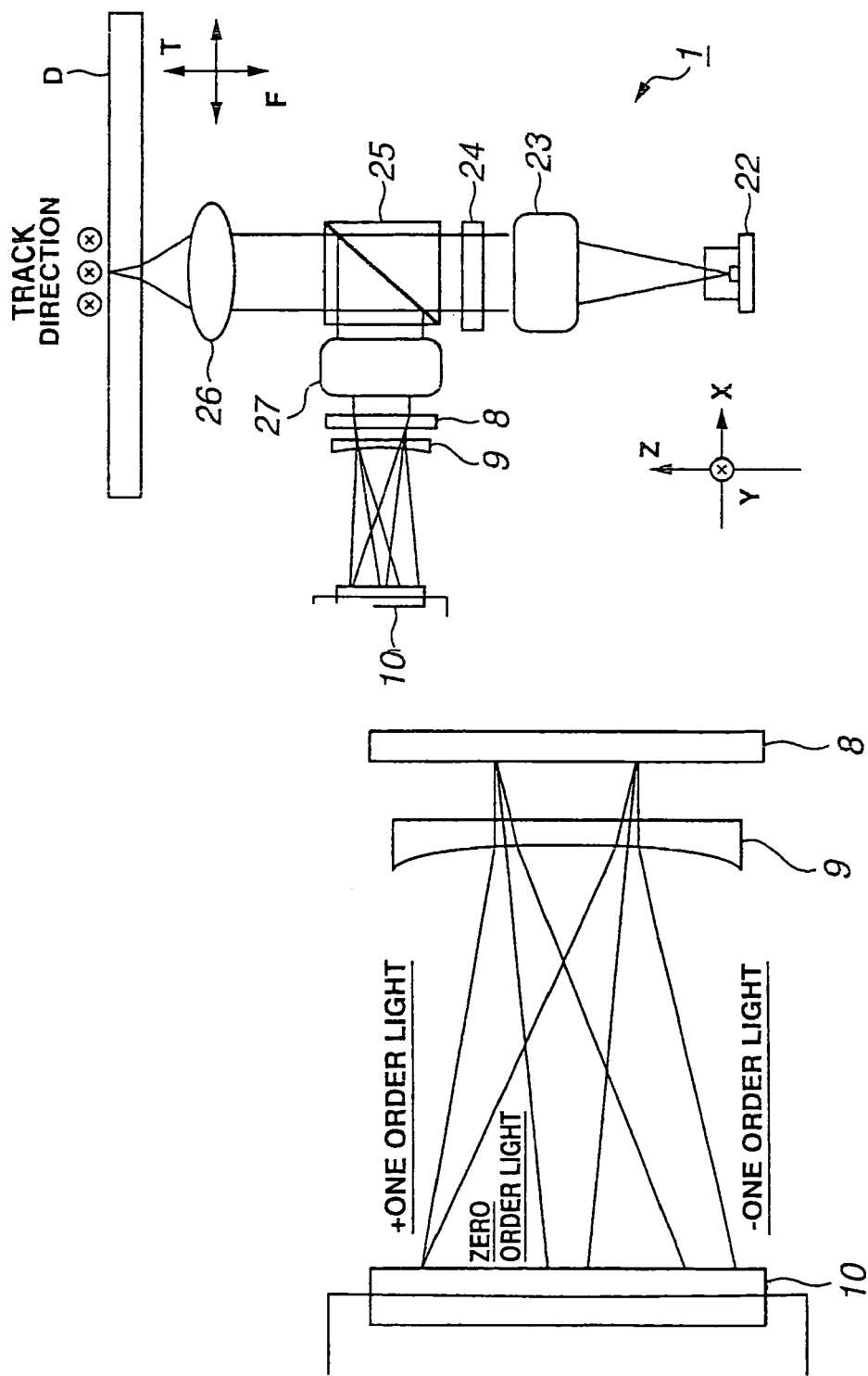
FIG. 3A is a side view showing an embodiment of anoptical head according to the present invention.
FIG. 3B is a side view showing a hologram device and a photodetector portion to an enlarged scale.

The optical head of the present invention is configured as shown in FIGS. 3A and 3B, and includes an optical system, comprised of optical components of a so-called discrete optical system, mounted separately from one another. The optical head includes photodetector devices ahead and at back of a focusing position of a return light beam for generating focusing error signals as the error information for controlling the focusing position of the light beam with respect to the recording surface of the optical disc, thereby realizing a spot size method exploiting changes in the spot diameter at this position.

In FIG. 3A, the optical head 1 includes a semiconductor laser device 22, a collimator lens 23, a light diffraction device 24, a beam splitter 25, an objective lens 26, a second collimator lens 27, a hologram device 8, a cylindrical lens 9 and a photodetector device 10. These optical components are mounted separately from one another. In this optical head 1, a light beam radiated from the semiconductor laser device 22 is incident on the collimator lens 23 and thereby converted into a parallel light beam, which then is incident on the light diffraction device 24. The light diffraction device 24 separates the incident light beam into a straight zero order light and 1105 one order diffracted light. These light beams fall on the beam splitter 25 so as to be thereby separated into a light beam radiated from the semiconductor laser device 22 and a reflected light beam from the signal recording surface of the optical disc D.

In general, the beam splitter 25 is made up of a pair of optical prisms and a multilayered dielectric film deposited by evaporation or sputtering between these paired prisms. A light beam separated by and transmitted through the beam splitter 25 falls on the objective lens 26.

The objective lens 26 converges the incident light on a sole point on the signal recording surface of the optical disc D for illumination. The objective lens 26 is driven in the focusing direction and tracking direction, indicted by arrows F and T in FIG. 3, respectively. The reflected light beam, separated by the beam splitter 25, is again incident on the beam splitter 25, through the objective lens 26, so that a light beam of a light volume corresponding to the refractive index of the beam splitter 25 is split on reflection.

The reflected light beam, split by the beam splitter 25, is converted by the collimator lens 27 into converged light. The light beam, converted into the converged light, then falls on the hologram device 8 and is thereby split into the ±one order light for detecting the focusing error signals by the spot size method and the zero order light for detecting RF and tracking error signals. The hologram device 8 has the function of controlling the focusing position of the zero order light and the ±one order light, and shifts the focusing position of the ±one order light non-symmetrically to enlarge the spot diameter of the ±one order light in the tracking direction, extending along the recording track of the disc D, that is in the tangential direction.

The respective light beams, split by the hologram device 8, is transmitted through the cylindrical lens 9, so that the zero order light thereof will be used to produce tracking error signals by the differential push-pull method. The respective light beams are received by the photodetector device 10 as the focusing positions thereof are extended in the radial direction traversing the track direction on the optical disc D. So, the zero order light spot is input to the light receiving section for tracking error detection of the photodetector device 10 as a beam spot elongated in the radial direction, as will be explained subsequently.

On the other hand, the ±one order light has its focusing position controlled asymmetrically by the hologram device 8 and is thereby enlarged to the same spot diameter in the tangential direction. The ±one order light, thus enlarged in spot diameter, falls on the light receiving sections for spot light detection of the photodetector device 10.

As for the radial direction of the tone order light, the −one order light and ±one order light are received by the photodetector device 10 in the state of e.g., being enlarged and contracted in the radial direction, respectively, as shown in FIG. 3B. However, there is no direct impediment because the spot size detection for focusing error detection may be made by the width in the tangential direction.

Figure 4:
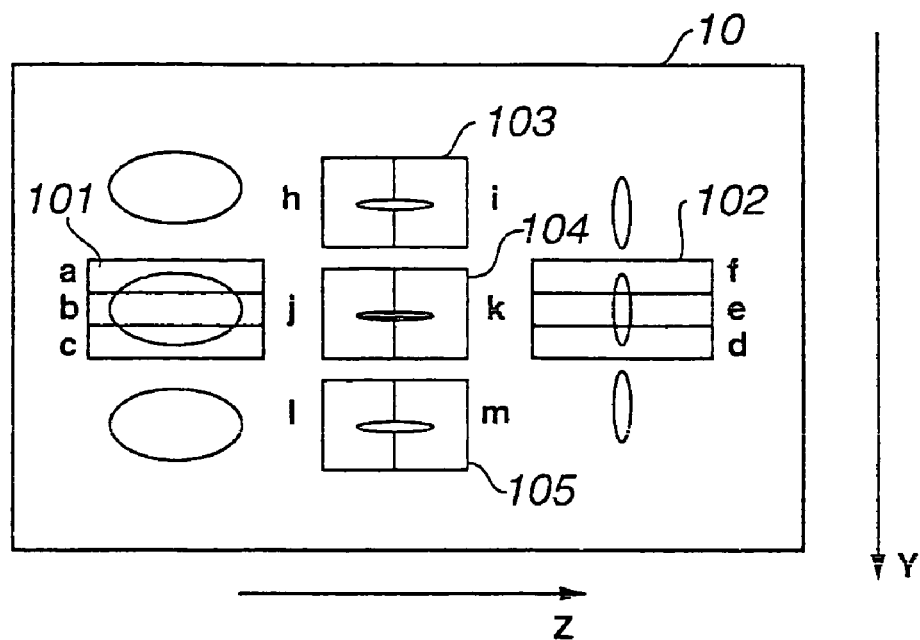
FIG. 4 is a plan view showing an embodiment of a photodetector used in the optical head shown in FIG. 3A.

FIG. 4 shows a plan view for illustrating the relation between the spot on the photodetector device 10 and the light receiving sections.

In FIG. 4, both side light receiving sections 101, 102, having split areas a to e, respectively, are used for detecting focusing error signals, whilst three mid light receiving sections 103 to 105, having split areas h to m, are used for detecting tracking error signals.

The mid light receiving section having split areas j and k are used for detecting RF signals.

The spot size in the Y-direction, that is in the tangential direction, is not affected by the cylindrical lens 9, thus not influencing focusing calculations employing the spot size method.

On the other hand, the spot size in the Z-direction, that is the radial direction, in FIG. 4, of the spot of the zero order light separated by the hologram device 8, that is the spot received by the light receiving sections h to m, is enlarged by the operation of the cylindrical lens 9, thus allowing for differential push-pull detection.

The respective signals detected by the photodetector device 10, described above, may be detected e.g., by the following equations:

focusing error signals=$(a+c-b)-(d+e-f)$ tracking error signals=$(j-k)-k \times \{(h-i)+(l-m)\}$ RF signals=$j-k$ where a to m are output values of the respective light-receiving areas on the photodetector device 10 and K is a coefficient.

By the above-described arrangement, three signals may be obtained by the sole photodetector device 10, so that the tracking error signals can be detected by the push-pull method without using two photodetectors nor branching prisms.

The result is that, by reducing the number of component parts and by simplifying the photodetector adjustment process, the cost of component parts and production cost can be lowered, while the optical head may be reduced in size.

In the embodiment shown in FIG. 3, the hologram device 8 and the cylindrical lens 9 are illustrated as being distinct component parts. Alternatively, the hologram device may be provided on the planar surface of the cylindrical lens (see FIG. 10), thus enabling the number of component parts to be reduced further. This applies for embodiments explained subsequently.

Figure 5:
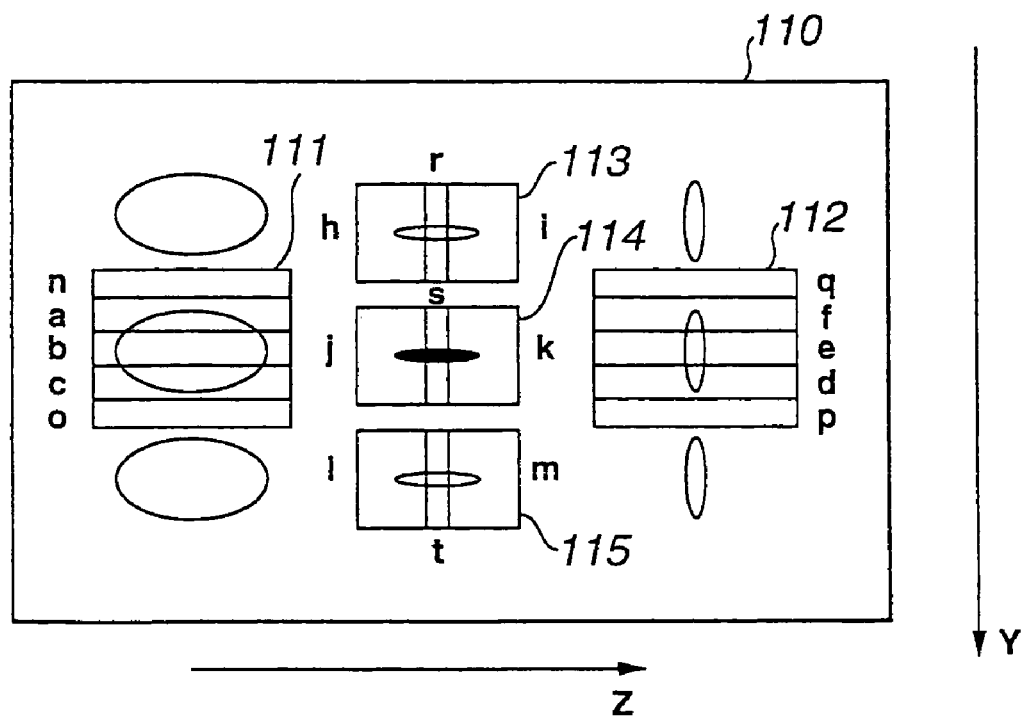
FIG. 5 is a plan view showing an embodiment of a photodetector used in the optical head shown in FIG. 3A.

For preventing variations in the offset of the focusing error signals by the spot size method at defocused positions, the light receiving sections 101, 102 for spot size detection may be split into five portions, as in the light receiving sections 111, 112 shown in FIG. 5, in place of into three portions, as shown in FIG. 4. That is, by using the outermost two split portions n, o, p and q of the five split portions of the light receiving sections 111, 112, as areas for canceling the offset of the focusing error signals at the defocused positions, the focusing error signals can be precipitously converged to approximately zero at the defocused positions.

In push-pull detection, the mid portion of the spot, responsible for signal distortion, may be removed in the land-groove medium, by splitting the light spot into three portions. The light receiving sections 113 to 115, shown in FIG. 5, represent typical splitting areas for realization of this processing. This can be realized readily by not using the light reception signals at the mid split areas r, s and t in the respective light receiving sections 113 to 115 for calculating the tracking error signals.

The respective signals in case of providing the photodetector device 10 shown in FIG. 5 may be detected e.g., by the following equations:

focusing error signals=$(a+c-b-n-o)-(d+f-e-p-q)$ tracking error signals=$(j-k)-K\times\{(h-i)+(l-m)\}$ RF signals=$j+k+s$ where a to t are output values of the light receiving areas on the photodetector device and K is a coefficient.

Referring to FIGS. 6A and 6B, a modification of the optical head according to the present invention is explained.

An optical head 2, shown in FIGS. 6A and 6B, shapes the beam spot using an anamorphic prism.

In an optical recording medium recording and/or reproducing apparatus, in particular an optical recording medium recording and/or reproducing apparatus for a CD-R/RW, DVD-R, DVD-RAM, DVD-R/RW, DVD+RW and DVD-BLUE, recording characteristics are changed by the shape of a beam spot converged on an optical disc D.

As a light source for this sort of the recording and/or reproducing apparatus, semiconductor laser is prevalently used. The semiconductor laser is such that an angle of divergence of a radiated light beam in a direction parallel o the junction surface is structurally on the order of 10° and 20 to 30°, in terms of the half value total width, in a direction parallel to the junction surface. This difference in the angle of divergence is termed an aspect ratio. The multiplication ratio in the direction of divergence of the light beam incident on the optical disc D in an elliptical form with different angle of divergence depending on the direction of divergence is changed, that is compressed or expanded, in a specified direction of the cross-section of the light beam, using the so-called anamorphic lens, and the resulting light beam is radiated, by way of beam shaping, to prevent overmuch non-uniformities in the light intensity distribution from being produced depending on directions.

An optical path of the optical head 2, shown in FIGS. 6A and 6B, is now explained briefly.

The light beam radiated from the semiconductor laser 61 is collimated by a collimator lens 62 to fall on an anamorphic lens 63. An anamorphic lens of the straight proceeding type proposed in Japanese Patent Application P2000-123723 of the present Assignee, is used here.

The cross-section of the light beam in a direction parallel to the junction surface of the semiconductor laser 61 is enlarged by the anamorphic lens 63 to correct non-uniformities in the light intensity distribution in the light beam.

The light beam, corrected for the light intensity distribution, has its direction of light polarization rotated by a half wave plate 64, and is split by a light diffracting device 65 into three beams used for tracking error detection and land-groove discrimination, and is transmitted as a P-polarized light beam. The transmitted light beam is circularly polarized by a quarterwave plate 68 and has its proceeding direction converted by 90° by a light path uplifting mirror 69 for reducing the thickness of the optical head 1. The light beam then falls on an objective lens 70. It is noted that a polarizing beam splitter 66 has its polarizing beam splitting plane 66a formed such as to transmit and reflect the P-polarized light component and the S-polarized light component of the light beam, respectively.

The light diffracting device 65 is designed to defocus the side spot only slightly to use a land-groove discrimination (CTS signal) as proposed by the present Assignee in the Japanese Patent Application H-11-375339.

The light beam is converged by the objective lens 70 on the signal recording surface of the optical disc D to record and/or reproduce information signals.

The return light beam, reflected back from the optical disc D, is re-collimated by the objective lens 70 into a parallel light beam and has its optical path converted by 90° by the optical path uplifting mirror 69 to fall on the quarter wave plate 68. The reflected light beam then is reflected by the polarizing beam splitter surface 66a of the polarizing beam splitter 66 as an S-polarized light beam and is reflected by total reflection by a total reflection surface 66b to fall on a return path collimator lens 71. The light beam is converted by the return path collimator lens 71 into converged light, which then falls on a hologram device 72.

The light beam then is separated by the hologram device 72 into the ±one order light for detecting focusing error signals by the spot size method and the zero order light for detecting RF signals and tracking error signals, as in the optical head shown in FIG. 3.

For producing tracking error signals by the differential push-pull method, using only the zero order light of each of the separated light beams, these light beams are transmitted through the cylindrical lens 73, so that the light beams are extended only in the focusing positions thereof with respect to the radial direction traversing the track direction on the optical disc D, before being received by the photodetector device 74.

Based on the light beams, received by the photodetector device 74, servo signals, such as focusing error signals, tracking error signals or the land-groove decision signals, and RF signals, are generated to control information reproduction, the position of the light beam converged on the signal recording surface of the optical disc D, and the beam spot diameter.

Figure 7:
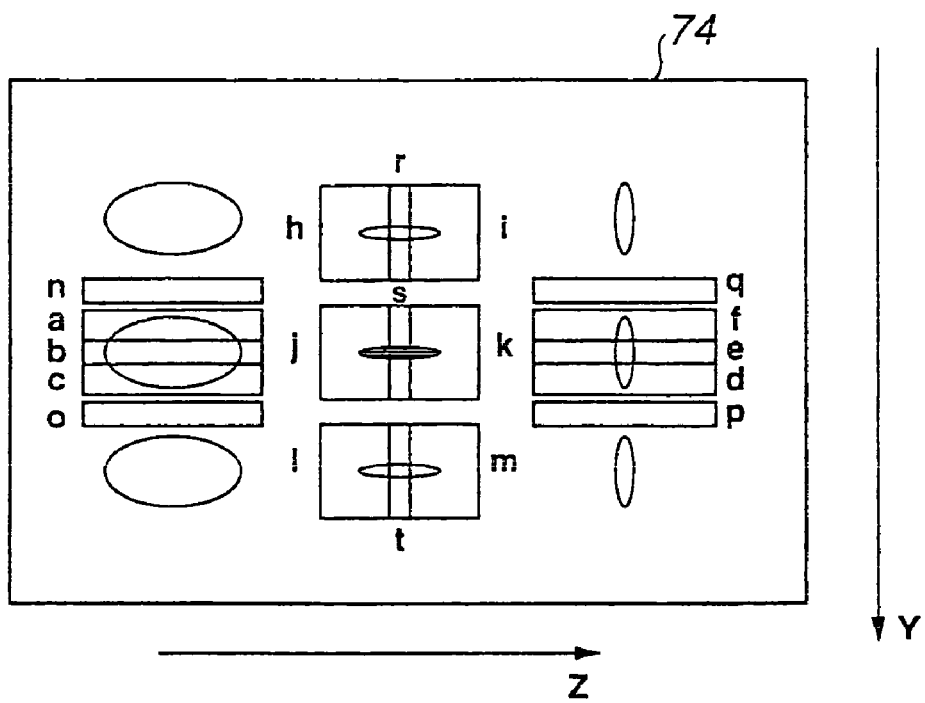
FIG. 7 is a plan view showing a photodetector employed in the optical head.
Figure 8:
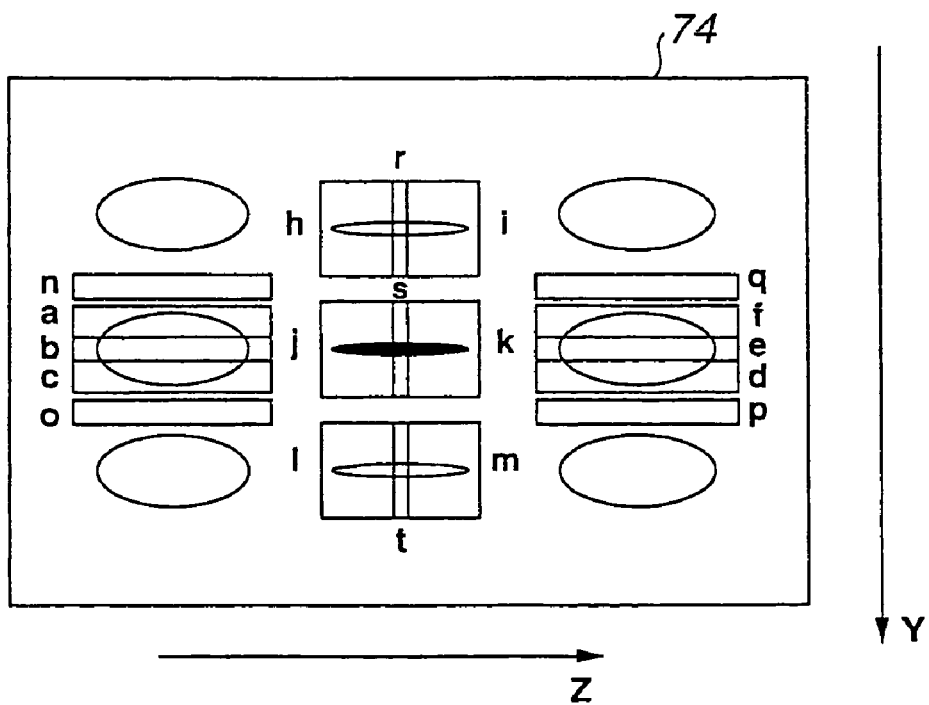
FIG. 8 is a plan view showing a modification of the photodetector.

FIGS. 7 and 8 are plan views showing the relation between the light receiving sections and the beam spot on the photodetector device 74 used in the optical head 1 shown in FIGS. 6A and 6B.

Two of typical hologram devices 72, having different designs, are shown in FIGS. 7 and 8.

Figure 9C:
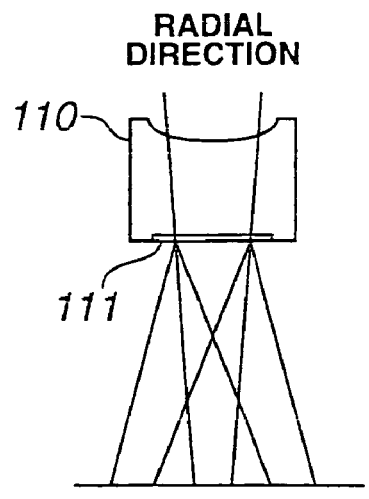
Figure 9C:
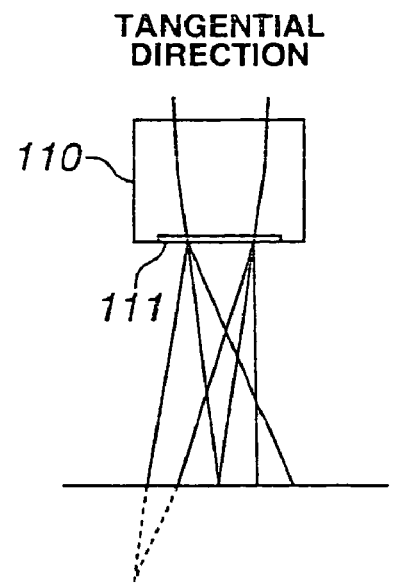
Figure 9C:
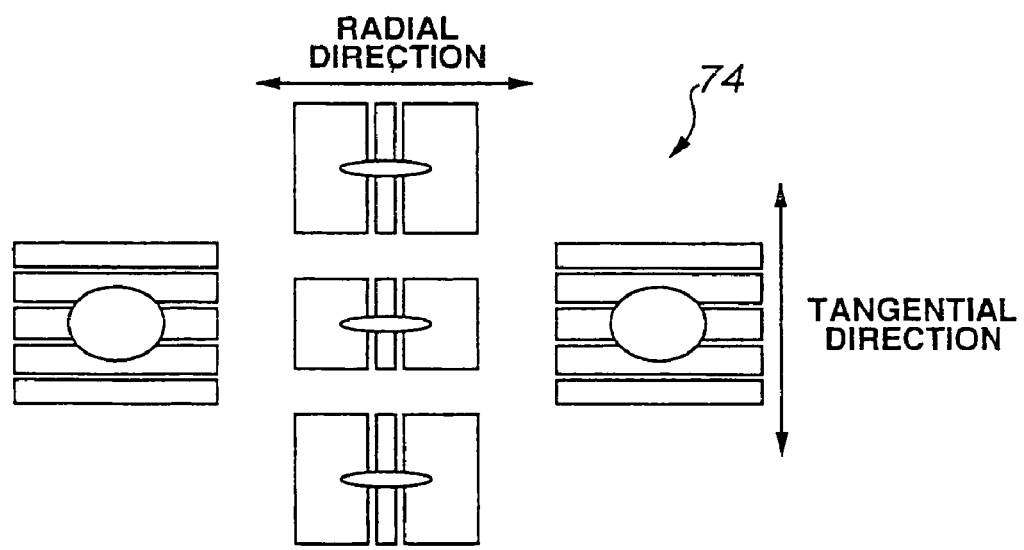

FIG. 9 shows the aforementioned case.

In FIG. 9A, the focusing positions of the zero order light and the ±one order light are globally controlled by the hologram device 72, as in the photodetector device 10 used in the above-described optical head 1, so that, if the focusing position is shifted in the radial direction by the cylindrical lens 73, one of the beam spots of the ±one, order light is enlarged in the radial direction, with the other light beam being contracted in the radial direction.

If the spot is in such state, each spot of the ±one order light has a common size in the tangential direction, so that there is no impediment in detecting the spot size.

If, in such configuration in which the beam spot diameter of one of the beam spots of the ±one order light is enlarged in the radial direction, the beam spot of e.g., the one order light is to be expanded in the radial direction, the one spot of the ±one order light is excessively large in the radial direction, so that a larger space needs to be provided for the light receiving section, thus increasing the size of the photodetector device. If conversely the one spot of the ±one order light is to be prevented from being enlarged in the radial direction, the beam spot of the zero order light cannot be enlarged sufficiently in the radial direction, so that difficulties are presented in detecting tracking errors.

In an embodiment shown in FIG. 8, the non-symmetries in the radial direction of the respective beam spots of the ±one order light are removed in order to improve the above-mentioned deficiency.

In the photodetector 74, shown in FIG. 8, the focusing position of the ±one order light is shifted by the hologram device 72 only in the direction of detecting the spot size, that is in the tangential direction. Consequently, the focusing positions in the radial direction of three beam spots, that is the spots of the zero order light and the ±one order light, may be maintained substantially equally.

Thus, non-symmetries of the spot shape of the ±one order light are not produced even if the focusing position in the radial direction is shifted by the cylindrical lens 73.

FIGS. 9A to 9C illustrate specified embodiments of respective beam spots in case of using the above-described hologram device 72. Specifically, FIGS. 9A and 9B show the state of the beam spot in the radial direction and that of the beam spot in the tangential direction, respectively. FIG. 9C shows the relation between the spot and the respective light receiving sections in the photodetector device.

Meanwhile, a hologram device 111 in FIG. 9A and FIG. 9B is mounted integrally on a planar surface of the cylindrical lens 110.

Referring to FIG. 9A, only the shifting of the focusing position by the cylindrical lens 110 acts on each beam spot, in the radial direction, with each spot being substantially the same in diameter. That is, the hologram device 111 is not in operation.

On the other hand, as shown in FIG. 9B, the focusing position of each light spot is shifted individually, by the operation of the hologram device 111, in the tangential direction, with the focusing position of the zero order light substantially coinciding with the light receiving surface of the photodetector device. The focusing position of one of the ±one order light is extended, while that of the other light is shortened, so that the light is received by the photodetector device in the state of the equal spot diameter.

FIG. 9B shows the ±one order light on each side of the zero order light. This is only for the sake of illustration, such that, in effect, the spots of the zero order light and the ±one order light are arranged in a line in the radial direction and are overlapped in the direction of the drawing sheet.

By the above-described configuration, the spot diameter of the zero order light can be enlarged in the radial direction, which is the direction of detecting the push-pull, in a limited light receiving area, so that it is possible to alleviate deterioration in characteristics by the lowering of the detection accuracy despite position excursions caused by e.g., changes in the spot diameter due to defocusing or environmental changes in the beam spot with respect to the light receiving sections.

Figure 10:
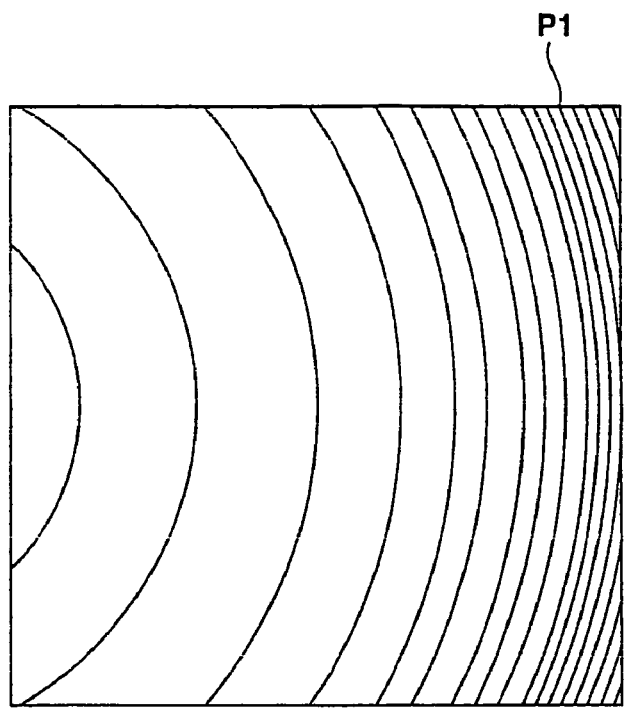
FIG. 10 is a is a plan view showing an exemplary pattern of a hologram device used in the photodetector shown n FIG. 7.
Figure 11:
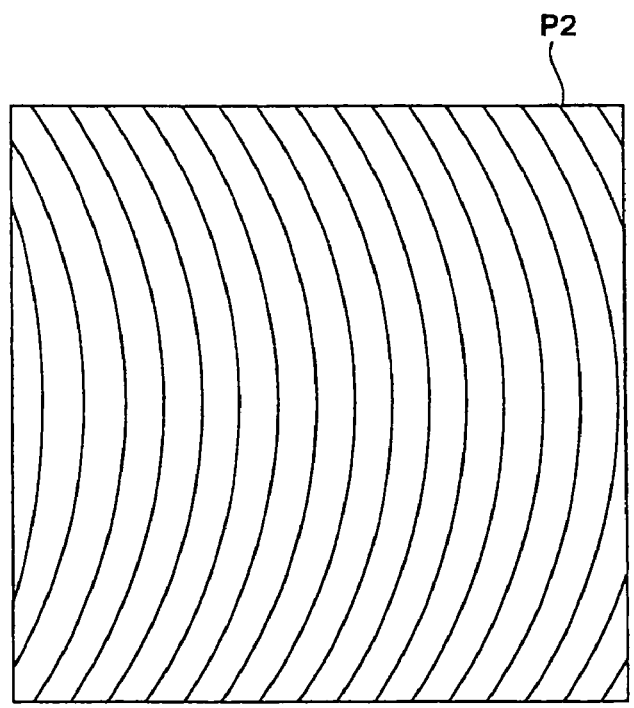
FIG. 11 is a plan view showing an exemplary pattern of a hologram element used in a photodetector shown in FIG. 8.

FIGS. 10 and 11 show an exemplary pattern of a hologram device in association with FIGS. 7 and 8. A may be seen from these figures, a hologram pattern P1 shown in FIG. 10 has the power not only in the tangential direction but also in the radial direction, so that there are caused changes in characteristics depending on the light beam transmitting position in the radial direction.

A hologram pattern Plasma cell 2, shown in FIG. 11, associated with FIG. 8, has no power in the radial direction, so that the same pattern is repeated in the radial direction. Therefore, constant characteristics may be maintained at all times even if the light beam transmitting position is changed.

In the configuration of FIG. 8, the spot interval may be smaller because of the symmetrical shape of spots of the ±one order light, in addition to the aforementioned favorable effect, thus allowing to increase the lattice interval of the hologram device.

If output values of respective light receiving areas on the photodetector 74 are denoted a to t, the signals detected by the photodetector 74 may be detected by, for example, the following equation:

focusing error signals=$(a+c-b-n-o)-(d+f-e-p-q)$ tracking error signals=$(j-k)-K\times\{(h-i)+(l-m)\}$ where K is a coefficient.

land groove decision signal=$\{(h+i)-r\}-\{(l+m)-t\}$

RF signal=$j+k+s$.

This allows to reduce the number of component parts and to simplify the adjustment process of photodetectors to lower the costs for parts and manufacture as well as to reduce the size of the optical head.

FIGS. 12A and 12B are plan and side views showing a further embodiment of the optical head according to the present invention.

The optical head 3 shows an optical head of the type in which the light is transmitted through an anamorphic prism for both the forward and return light paths.

The light paths if the optical head 3, shown in FIGS. 12A and 12B, are explained briefly.

The light beam radiated from the semiconductor laser 61 is collimated by the collimator lens 62 of the forward path into collimated light, which is separated by the light diffracting device 65 into three beams used for tracking error detection and land-groove discrimination. These light beams are deflected in the direction of polarization by a half wave plate 75c secured on the light incident side of a polarizing beam splitter prism 75 and are transmitted as P-polarized light through the polarizing beam splitter prism 75 to fall on an anamorphic prism 76. Meanwhile, the polarizing beam splitter prism 75 has its polarizing beam splitter surface 75a formed so that it transmits the P-polarized light component of the light beam transmitted through the polarizing beam splitter prism 75 without transmitting the S-polarized component.

By the anamorphic prism 76, the cross-section of the light beam in a direction parallel to the junction surface of the semiconductor laser is enlarged to correct the non-uniformities in the light intensity distribution in the light beam to generate a differential between the multiplication factor in a direction parallel to the junction surface of the semiconductor laser and that in a direction perpendicular thereto.

The light beam, corrected in the light intensity distribution, is adjusted to the state of optimum spherical aberration in an optical head by a liquid crystal device 77 serving for correcting the spherical aberration produced e.g., by errors in thickness of the disc substrate. The optical head is used e.g., for DVR-BLUE employing an objective lens improved in density and having a large numerical aperture (NA). The light beam then is circularly polarized by a quarter wave plate 68 and deflected in its proceeding direction by 90° by an optical path uplifting mirror 69 for reducing the thickness of the optical head 1 before falling on the objective lens 70. The light beam is converged by the objective lens 70 and illuminated on the signal recording surface of the optical disc D to record and/or reproduce information signals.

The light beam incident on the optical disc D and reflected back from the optical disc D is again converted to a collimated light beam by the objective lens 70 and has its optical path deflected by 90° by the optical path uplifting mirror 69 to fall on the quarter wave plate 68. The light beam having its direction of polarization deflected by the quarter wave plate 68 with respect to the forward light path is directly transmitted through the liquid crystal device 77 and again transmitted through the anamorphic prism 76 so as to be reflected by S-polarized light by the polarizing beam splitter surface 66a of the polarizing beam splitter prism 66. The light beam then is totally reflected by the total reflection surface 66b to fall on the return path collimator lens 71. The light beam is converted by this return path collimator lens 71 into converged light, which then falls on the hologram device 72.

The reflected light beam then is split into the ±one order light, having its focused position shifted only in the tangential direction, for detecting the focusing error signals by the hologram device 72, in accordance with the spot size method, and into the zero order light, for detecting the RF signals, tracking error signals and land-groove discrimination signal.

The light beam, thus split, has its focusing position extended only in the radial direction of traversing the track direction on the optical disc, so as to be received by the photodetector 74, in order to produce tracking error signals by the differential push-pull method, using the zero order light split by the hologram device, by a cylindrical lens provided on the photodetector 78. Based on the detection signal from the photodetector, servo signals, such as focusing error signals, tracking error signals and land-groove discrimination signals, and RF signals, are generated to reproduce information signals as well as to control the light converging position and the position of the beam spot converged on the optical disc.

Figure 13:
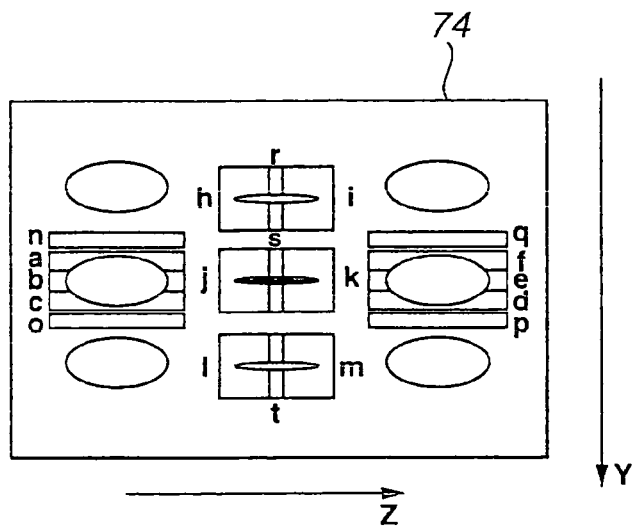
FIG. 13 is a plan view showing an embodiment of a photodetector device provided on the optical head shown in FIGS. 12A and 12B.

FIG. 13 shows the relation between the light receiving sections and the beam spot on the photodetector 74 of the optical head 3 shown in FIGS. 12A and 12B.

If output values of the respective light receiving areas on the photodetector 74 are denoted a to t, the signals on the photodetector 74 may be detected in accordance with the following equations;

focusing error signals=$(a+c-b-n-o)-(d+f-e-p-q)$ tracking error signals=$(j-k)-\{(h-i)+(l-m)\}$ where K is a coefficient;

land-groove discrimination signal=$\{(h+i)-r\}-\{(l+m)-t\}$

RF signal=$j+k+s$.

It is noted that, in the present optical head 3, in which the light traverses the anamorphic prism in both the forward and return paths, the multiplication factor from the light converging point on the disc to the photodetector differs with the direction having the conversion of the multiplication factor by the anamorphic prism and with the direction not having such conversion. On the other hand, a direction 1 along which the photodetector 74 detects focusing errors is perpendicular to a direction along which the photodetector 74 detects the tracking errors and the land-groove discrimination signal. The directions 1 and 2 are termed the tangential direction and the radial direction, respectively.

In the present optical head 3, the directions of conversion of the multiplication factor are set so that $$\beta 1 = \beta A \times \beta 2$$

where $\beta A$ is the multiplication factor of the anamorphic prism, $\beta 1$ is the multiplication factor of the direction 1 as the multiplication factor conversion direction by the anamorphic prism and $\beta 2$ is the multiplication factor of the direction 21 as the multiplication factor conversion direction by the anamorphic prism.

The favorable effect of this arrangement of the multiplication factor converting directions is now explained.

It is presupposed that the numerical aperture of the objective lens is NA, the focusing pull-in range is Spp, the spot diameter of the direction 1 is $\phi 1$, the spot diameter of the direction 2 is $\phi 2$ and the defocusing is $\Delta$Def.

If the multiplication factor converting directions of the anamorphic prism are such that $\beta 1 = \beta A \times \beta 2$, as described above, the shift of the focusing position with respect to the defocusing $\beta$Def is such that direction 1: $\Delta 1 \approx \Delta \text{Def} \times 2 \times (\beta A \times \beta 2)^2$ direction 2: $\Delta 2 \approx \Delta \text{Def} \times 2 \times \beta 2^2$.

The spot diameter $\phi 1$ on focusing is given by $$(\text{Spp}/2) \times 2 \times (\beta A \times \beta 2)^2 \times \{(2 \cdot NA)/(\beta A \times \beta 2)\} = 2 \cdot NA \cdot \text{Spp} (\beta A \times \beta 2) \quad (1)$$

The variation $\Delta\phi 2$ of the spot diameter $\phi 2$ on occurrence of defocusing of $\Delta$Def is given by $$\Delta \text{Def} \times 2 \times \beta 2^2 \times (2 \cdot NA)/\beta 2 = 4 \cdot NA \cdot \beta 2 \cdot \Delta \text{Def} \quad (2)$$

If, in the above equation 1, the focusing pull-in range Sp is fixed and the spot diameter $\phi 1$ on focusing is fixed, the spot diameter $\phi 1$ is given by $$\phi \approx 2 \cdot NA \cdot \text{Spp} \cdot (\beta A \times \beta 2) = \text{constant}$$

so that the multiplication factor $\beta 2$ for the direction 2 for detecting the tracking error and the land-groove discrimination signal is in proportion to $1/\beta A$.

$$\beta 2 \propto 1/\beta A$$

So, the variation of the spot diameter $\phi 2$ for the defocusing $\phi$def is $$\Delta\phi 2 / \Delta \text{Def} \approx 4 \cdot NA \cdot \beta 2 \propto 1/\beta A \quad (3)$$

so that it is inversely proportional to the multiplication factor $\beta A$ of the anamorphic prism. Meanwhile, if the direction of the multiplication factor of the anamorphic prism is the radial direction, it suffices to substitute $1/\beta A$ for $\beta A$.

The result is that, if the direction of the multiplication factor of the anamorphic prism is the tangential direction, the change in the spot diameter β2 with respect to defocusing may be smaller.

As described above, if, when the direction 1 of detecting the focusing error is perpendicular to the direction 2 of detecting the tracking error/land-groove discrimination signal, that is when the direction 1 is the tangential direction and the direction 2 is the radial direction, and when the multiplication factors for the directions 1 and 2 are β1 and β2, the directions of converting the multiplication factor by the anamorphic prism with the multiplication factor βA are such that β1=βA×β2, it is possible to reduce the change in the spot diameter of the direction of detecting the tracking error/land-groove discrimination signal (direction 2) to suppress changes in characteristics of the tracking error/land-groove discrimination signal due to defocusing.

Meanwhile, three spots for detecting the tracking; error/land-groove discrimination signal are arranged in a direction perpendicular to the direction 2. In separating these spots on the photodetector, it is the multiplication factor β1 of the direction 1 that determines how many number of times the separation on the photodetector is to be that on the optical disc. If the spot separation on the disc is constant, larger separation may be achieved on the photodetector, thereby achieving the improved degree of freedom in designing.

Figure 14A:
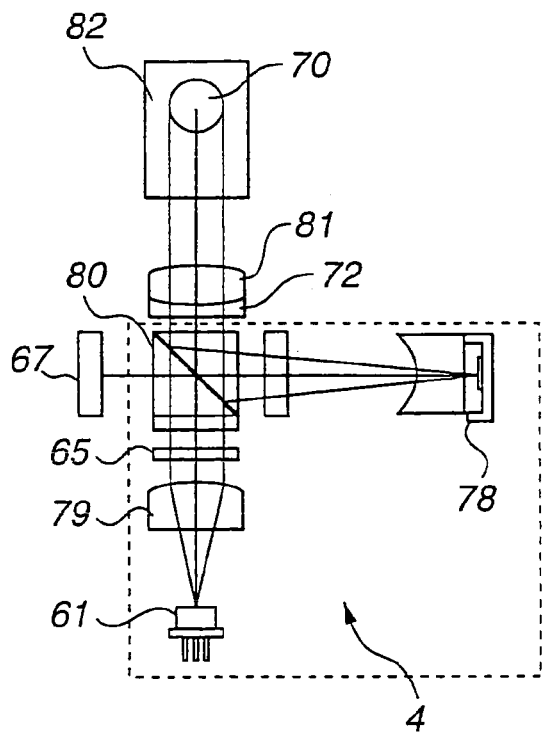
FIG. 14A is a plan view showing a further embodiment of the optical head according to the present invention.
Figure 14B:
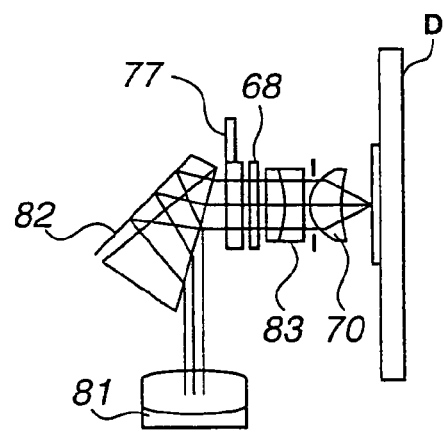
FIG. 14B is a side view thereof.
Figure 15:
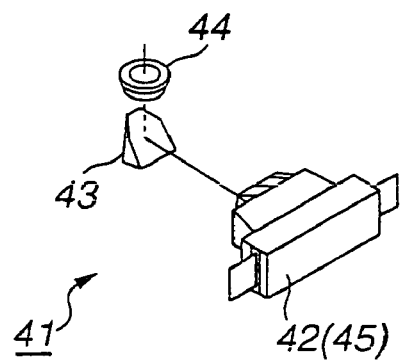
FIG. 15 is a perspective view showing an embodiment of an optical head having a light receiving/emitting device according to the present invention.

In FIGS. 14A and 14B, there is shown a further embodiment of an optical head embodying the present invention.

In this optical head 4, a collimator lens 81 is used in common on both the forward and return optical paths and the anamorphic prism and the optical path uplifting mirror are unified together. There is also provided a color aberration correction lens in consideration of generation of the color aberration in case of employing a short wavelength light source with the wavelength of approximately 405 nm.

An optical path of the optical head 4 shown in FIGS. 14A and 14B is explained briefly.

The light radiated from the semiconductor laser 61 is passed through a coupling lens 79 whereby it is adjusted to a small value of the numerical aperture NA when the light falls on the polarizing beam splitter prism 80 and a collimator lens 81. The light is separated into three beams used by the light diffracting device 65 for tracking error detection and land-groove discrimination. These light beams are rotated in the direction of polarization by a half wave plate secured on the incident side of the polarizing beam splitter prism 80 and transmitted as P-polarized light through the polarizing beam splitter surface. The P-polarized light beams are converted by the collimator lens 81 to collimated light which has its cross-section parallel to the junction surface to the semiconductor laser 61 enlarged by the anamorphic prism 82. This corrects non-uniformities in the light intensity distribution in the light beam, while generating a multiplication factor difference between the multiplication factor in the direction parallel to the junction surface and that in the direction perpendicular thereto.

If an objective lens 70 with a large numerical aperture (NA) is used, as in the case of an optical head 4 used for reproducing a DVR-BLUE s a high density optical disc employing a light source of a short wavelength in the vicinity of 405 nm, the light beam, corrected for the light intensity distribution, is rendered to a state of optimum spherical aberration by the liquid crystal device 77, adapted for correcting the spherical aberration generated by e.g., an error in thickness of the disc substrate, and is circularly polarized by the quarter wave plate 68, so as to be then afforded with optimum color aberration by a color aberration correcting lens 83 to fall on an objective lens 70. By this objective lens 70, the light beam 70 is converged on the signal recording surface of the optical disc D to record and/or reproduce information signals.

The return light beam, reflected back from the optical disc D, is re-converted by the objective lens 70 into the collimated light, which then is transmitted through a color aberration correcting lens 83 to fall on the quarter wave plate 68. The light beam, deflected by the quarter wave plate 68 in its polarization direction by 90° relative to the forward optical path and directly transmitted through the liquid crystal device 77, is again reflected by the anamorphic prism 82 and collimated by the collimator lens 81 to a parallel light beam, which then is reflected as an S-polarized light by the polarizing beam splitter surface to fall on the hologram device 72.

The reflected light beam then is split into the ±one order light, having its focused position shifted only in the tangential direction, for detecting the focusing error signals by the hologram device 72, in accordance with the spot size method, and the zero order light, for detecting the RF signals, tracking error signals and land-groove discrimination signal. The light beam, thus split, has its focusing position extended only in the radial direction of traversing the track direction on the optical disc, so as to be received by the photodetector 74, in order to produce tracking error signals by the differential push-pull method, using the zero order light split by the hologram device, by a cylindrical lens provided on the photodetector 78.

Based on the detection signal from the photodetector, servo signals, such as focusing error signals, tracking error signals and land-groove discrimination signals, and RF signals, are generated to reproduce information signals as well as to control the light converging position and the position of the beam spot converged on the optical disc. The relation between the beam spot on the photodetector 74 and the light receiving sections is the same as that in FIG. 13 described above.

With the optical head 4, constructed as described above, the number of component parts and the size of the optical head can be smaller than with the aforementioned optical heads 1 to 3.

Referring to the drawings, a preferred embodiment of an integrated optical system employing the light emitting/receiving device used in the optical head of the present invention is hereinafter explained.

First, an optical head for a magneto-optical disc, in which the optical system for detecting magneto-optical signals is complex to render integration of the optical system more difficult, is explained. Meanwhile, an optical head hereinafter explained is usable with advantage for a magneto-optical disc with a diameter of approximately 64 mm.

An optical head 41 according to the present invention, usable with advantage in a recording and/or reproducing apparatus having a magneto-optical disc as a recording medium, is made up of light receiving/emitting devices 42, 45, compounded and integrated from alight source, a photodetector and an optical component, a mirror 43 for reflecting a light beam radiated from the light receiving/emitting devices 42, 45, and a finite multiplication factor objective lens 44 for converging the light beam from the light receiving/emitting devices 42, 45, reflected by the mirror 43, for illuminating the signal recording surface of the magneto-optical disc, not shown, and routing the light beam, reflected back from the signal recording surface of the magneto-optical disc, towards the light receiving/emitting devices 42, 45.

The objective lens 44 is supported by a lens supporting member, not shown, for movement in two directions perpendicular to each other, namely in the radial direction of the magneto-optical disc and in the direction along the optical axis. Based on the control signal received by the light receiving/emitting devices 42, 45 and generated by a signal processing circuit, a biaxial actuator shifts the lens supporting member to cause the movement of the objective lens 44 in a direction along the radius of the magneto-optical disc or in a direction towards and away from the magneto-optical disc. The objective lens 44 converges the light beam so that the light beam radiated from the light receiving/emitting devices 42, 45 will be focused at all times on the signal recording surface of the magneto-optical disc, while causing the converged light beam to follow the track of the magneto-optical disc.

Figure 16:
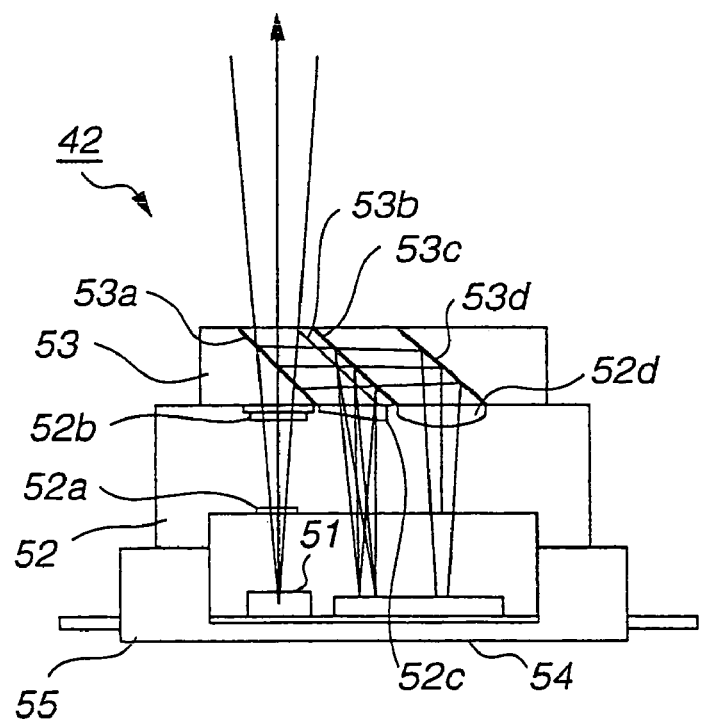
FIG. 16 is a side view showing an embodiment of a light receiving/emitting device built in an optical head shown in FIG. 15.

Referring to FIG. 16, showing the light receiving/emitting device 42, a light source 52 and a photodetector 54 are individually mounted at pre-set position on the inner surface of a package 55. On the photodetector 42 are mounted a set of split light receiving sections as shown. On the upper surface of the package 55 are mounted a set of optical components, that is a compound lens 52 and a compound prism 53 using an adhesive.

An optical path in this light receiving/emitting device 42 is explained.

In this light receiving/emitting device 42, a light beam radiated from the light source 51 falls on the compound lens 52. The light beam is separated by a grading 52a, provided on the side of the light source 51 of the compound lens 52 into three light beams used for detecting the tracking error by the three beam method. The light beams, so separated, are passed through a coupling lens 52b provided on the upper surface of the compound lens 52 for converting the multiplication factor of the optical system. The light beams then fall on the compound prism 53. The light beam transmitted through a polarizing beam splitter film 53a of the compound prism 53 is converged on the signal recording surface of the magneto-optical disc through a mirror 43 and the finite multiplication factor objective lens 44.

The light beam reflected by the signal recording surface of the magneto-optical disc is again incident through the objective lens 44 and the mirror 43 on the compound prism 53 of the light receiving/emitting device 42. The light beam separated by the polarizing beam splitter film 53a of the compound prism 53 from the forward light beam and reflected has its light polarization direction by 45° by the half wave plate 53b to fall on a polarized light isolating film 53c. Meanwhile, such a half wave plate disclosed e.g., in Japanese Laying-Open Publication H-8-152520 may be used as the half wave plate 53b.

The polarized light isolating film 53c is a thin optical film formed to transmit the S-polarized light substantially in its entirety and to reflect the S-polarized light substantially in its entirety.

By differentially detecting the magneto-optical disc signal by the polarized light isolating film 53c, herein based on the differential between the intensity of the light transmitted through the polarized light isolating film 53c and that of the light reflected by the polarized light isolating film 53c, by way of performing polarized light separation.

Figure 17:
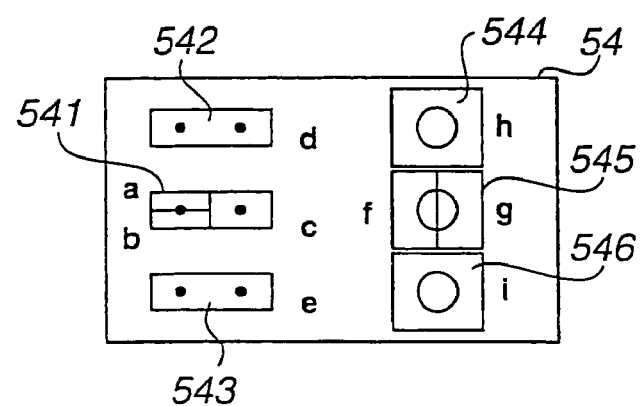
FIG. 17 is a plan view showing a photodetector device provided on the light receiving/emitting device.

The light beam, reflected by the polarized light isolating film 53c, is separated into two semi-circular light beams by a knife edge 52c provided on the compound lens 52 so as to be received by light receiving sections 541, 542 and 543 having light receiving areas a to e, as shown in FIG. 17.

Here, focusing error signals are detected by the Foucault/knife edge method, whilst tracking error signals are detected by the three-beam method.

The light beam transmitted through the polarized light isolating film 53c is reflected by a high reflection film 53d substantially in its entirety and has its optical path length adjusted by a concave lens 52d on the compound lens 52 so that three separated spots will be produced on the photodetector 54, so as to be received by light receiving sections 544, 545 and 546, with light receiving areas f to i, provided on the photodetector 54.

If output values of respective light receiving areas on the photodetector 54 are denoted a to i, the respective signals detected by the photodetector 54 may be detected e.g., by the following equations:

That is, the focusing error signals FE are derived from $FE = a - b$ by the Foucault/knife edge method, the tracking error signals $T_E$ are derived from $T_E = (d+h) - (e+i)$ by the three-beam method, the address signal $A_D$ is derived from $A_D = f - g$ by the push-pull method, and RF signals are derived from $RF = (a+b+c) - (f+g)$ by differential detection.

In distinction from the discrete optical system, the integrated optical system in general simplifies position adjustment among respective optical components appreciably.

In this configuration, the optical system simply makes adjustments so that the beam spot will be arranged on a splitting line of the split light receiving areas a and b to produce focusing error signals correctly. Otherwise, precision is guaranteed by machining and mounting accuracy of respective component parts. So, if the machining error in the distances between respective facets of the compound prism 53 or the error in the mounting positions of the light source 51 and the photodetector 54, for example, are larger, light spots on the light receiving sections f and g, split with a view to producing push-pull signals for detecting address or clock signals recorded by track wobbling, are shifted appreciably to the light receiving area f or to the light receiving area g, split for producing push-pull signals for detecting the address or clock signals recorded on track wobbling, so that optimum push-pull signals cannot be produced.

For example, if the distance between the main and side spots, as three spots on a disc, is 15 μm, and the multiplication factor of the optical system between the disc and the light receiving sections f and g of the photodetector 54 is five, the distance between the main and side spots at the light receiving areas f to i is 75 μm. In order for these three spots to be separated correctly from each other, the diameter of the respective spots is on the order of 50 μm. If conversely the machining error of the distance between the polarizing beam splitter film 53a and the high reflection film 53d due to machining tolerance of the compound prism is 15 μm and the error in the mounting positions of the light source 51 and the photodetector 54 is 10 μm, the light spot received is shifted completely to the light receiving section f or g in the worst case. On the other hand, if the spot diameter is enlarged with a view to evading shot shift, three beam spots are overlapped, again disabling detection of optimum signals.

Figure 18:
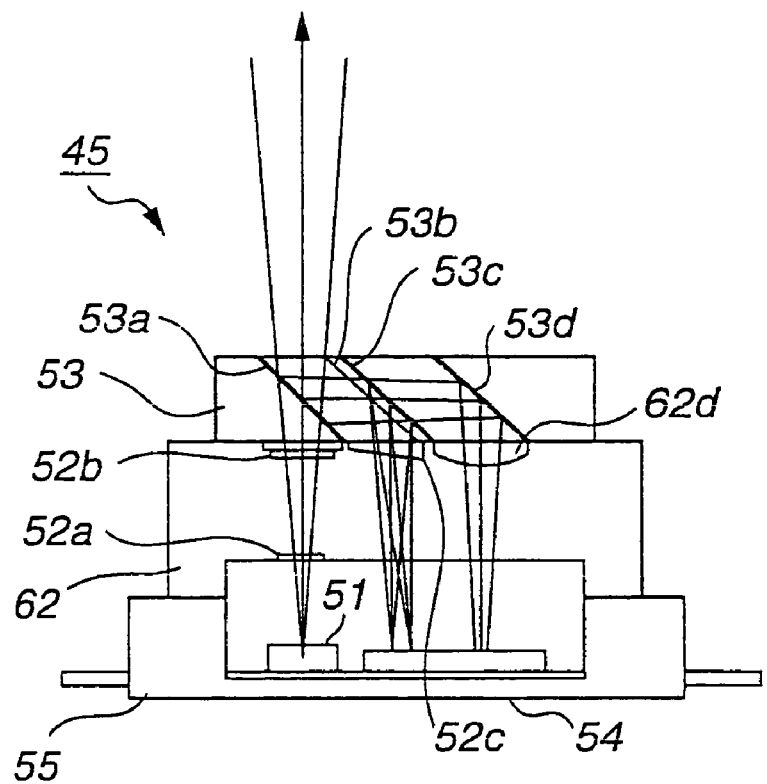
FIG. 18 is a side view showing a further embodiment of the light receiving/emitting device built in the optical head shown in FIG. 15.

For obviating the above problem, there is produced a light receiving/emitting device 45, as shown in FIG. 18. The light receiving/emitting device 45, shown in FIG. 18, is configured similarly to the light receiving/emitting device 42 shown in FIG. 16 except substituting a compound lens 62 having a toric lens 62*d* for the compound lens 52 having the concave lens 52*d*.

Figure 19:
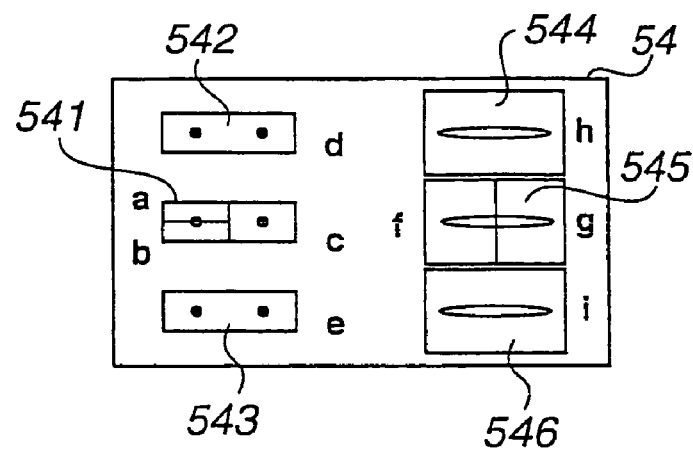
FIG. 19 is a plan view showing a photodetector device provided on the light receiving/emitting device.

The toric lens 62*d* is a lens having a differential radius of curvature between the transverse direction and the normal line direction in the drawing sheet surface. More specifically, as shown in FIG. 19 showing the relation between the pattern of the light receiving sections and the beam spots, the radius of curvature in the transverse direction on the drawing sheet surface is determined so that focusing will occur substantially in the direction of separating the three spots from one another in the light receiving sections f to i, whilst the radius of curvature in the normal line direction in the drawing sheet surface is determined so that the spot diameter in the direction of separating the light receiving sections f and g will be sufficiently large for detecting the push-pull signal. In this case, if the radius of curvature is set so that the spot diameter in the push-pull detecting direction will be 200 μm, the push-pull signals can be detected satisfactorily even if there occurs spot position shift on the order of 25 μm as described above. The result is realization of a light receiving/emitting device for a magneto-optical disc, appreciably small size and thickness, a reduced number of component parts, low costs and high reliability of the magneto-optical head.

An optical head, usable satisfactorily in a recording and/or reproducing device for a recording and/or reproducing optical recording medium, such as CD-R/RW, DVD-R, DVD-RAM, DVD-R/RW, DVD+RW or DVD-BLUE, as in the above-described optical head, and a light receiving/emitting device usable satisfactorily with this optical head, are hereinafter explained.

Figure 20:
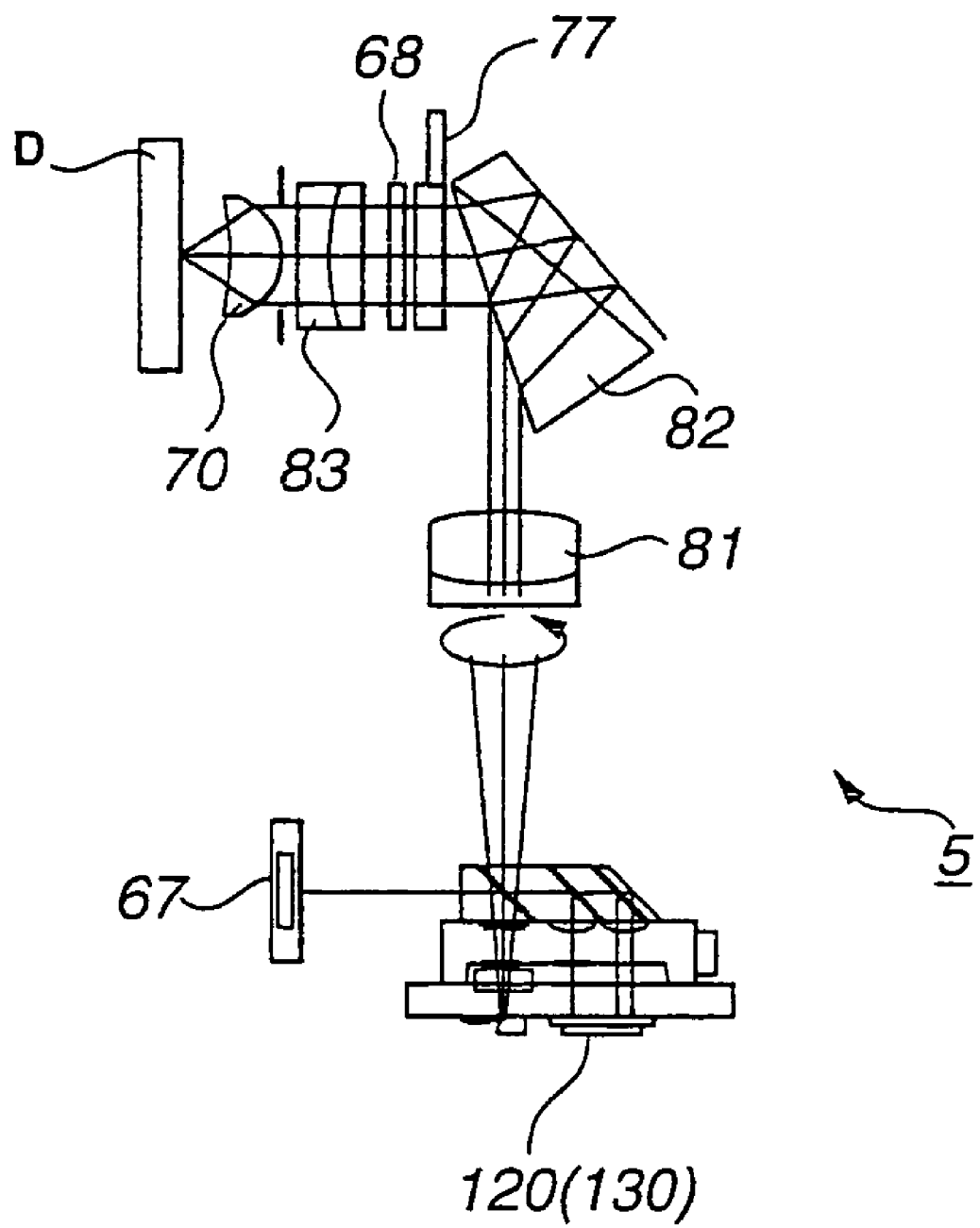
FIG. 20 is a side view showing a further embodiment of the optical head employing the light receiving/emitting device according to the present invention.

An optical head 5, employing a light receiving/emitting device according to the present invention, includes, as shown in FIG. 20, a light source, a light receiving/emitting device 120 or 130 and other optical components for converging the light beam radiated from the light receiving/emitting device 120 or 130 in an optimum state on the optical disc D. That is, the light receiving/emitting device shown in FIG. 20 is of an equivalent structure to a compounded and integrated version of a portion shown encircled with a broken line in FIG. 14A.

FIGS. 21A to 21C show a typical light receiving/emitting device according to the present invention. The optical path of the light receiving/emitting device 120 is such that the light radiated from a light source 121 has its optical path bent by a mirror prism 122, traverses an aperture in a substrate 123, and has its polarization direction rotated by a half wave plate 124 to fall on the compound lens 125. The light beam incident on the compound lens 125 is separated by a light diffracting device 125*a* on the compound lens 125 into three beams used for tracking error detection and for land-groove discrimination. The resulting light beams are passed through a coupling lens. 125*b* on the compound lens whereby the numerical aperture NA when the light beams are incident on a compound prism 126 and on a collimator lens 81 is converted to a smaller value. The light beams then are transmitted through a polarizing beam splitter film 126*a* of the compound prism 126 as P-polarized light to proceed towards the collimator lens 81. The polarizing beam splitter film 126*a* is configured to transmit the P-polarized component of the light beam, and to reflect the S-polarized component thereof.

The return light beam, reflected back from the optical disc, is again converted by the collimator lens 81 into the converged light beam, which then is reflected as S-polarized light by the polarizing beam splitter film 126*a* of the compound prism 126 and is partially reflected by and partially separated into transmitted light by the half mirror 126*b*. The reflected light is divided into the ±one order light, which has its focusing position extended only in the radial direction of traversing the track direction on the disc 125*c* on the compound lens, and which has its focusing position shifted only in the tangential direction for detecting the focusing error signals by the spot size method by the hologram device 125*d* on the compound lens 125, and into the zero order light for detecting the RF signals, tracking error signals and the RF signals. The signals, so separated, are received by a photodetector 127.

The light beam, transmitted through the half mirror 126*b*, has its direction of polarization rotated by an oblique incident half mirror 126*c*, and is separated by the polarizing beam splitter film 126*d* into the reflected light and the transmitted light, with the transmitted light being further totally reflected by a total reflecting surface 126*e*. The reflected light and the transmitted light are adjusted in spot diameter by a concave. lens 125*e* on the compound lens so as to be then received by a photodetector 127.

Based on the reflected light beam, thus received, there are generated servo signals, such as focusing error signals, tracking error signals and land-groove discrimination signals, and RF signals, for reproducing information signals recorded on the optical disc, and for controlling the light spot positions and the focusing positions on the optical disc. The relation between the spots on the photodetector and the light receiving sections is shown in FIGS. 21B and 21C.

The respective signals on the above-described photodetector 120 are as follows:

First, the focusing error signals, tracking error signals and the land-groove discrimination signals are generated based only on a detection output by the light receiving sections 127A to 127E shown in FIG. 21B. The signal generating process is the same as that explained in the previous embodiments and hence is not explained specifically.

If an output of the light receiving section 127F for detecting the RF signals, shown in FIG. 21C, is denoted RF, the RF signals may be detected by an equation RF signals=RF.

If outputs of the four-segment light receiving areas of the light receiving section 127G for detecting the tracking signals by the DPD method shown in FIG. 21C are denoted u, v, x and w, the DPD signal may be detected by the equation DPD signal=(u+w) and the equation of the phase difference signals of (u+w) and (v+x).

This enables RF signals to be produced from the sole photodetector (PD) to provide for a low noise and a broad bandwidth of the RF signals, while also enabling detection of the DPD signals.

The light receiving/emitting device according to the present invention may also be configured as shown in FIGS. 22A to 22C.

The optical path of the light receiving/emitting device 130 shown in FIG. 22A is now explained briefly. A light beam radiated from a light source 131 has its light path bent by a mirror prism 132 and is passed through an aperture in a substrate 133. The light beam then has its direction of light polarization rotated by a half wave plate 134 to fall on the compound lens 135. By the light diffracting device 135*a* on the compound lens, the light beam is separated into three beams used for tracking error detection and land-groove discrimination. The numerical aperture NA in incidence on the compound prism 136 and the collimator lens 81 is converted to a smaller value by a coupling lens 135b on the compound lens. The light beam then is transmitted as the P-polarized light through the polarizing beam splitter film 136a of the compound prism 136 to proceed towards the collimator lens 81. Meanwhile, the polarizing beam splitter film 136a transmits the P-polarized component, while reflecting S-polarized component.

The light beam reflected back from the optical disc is again converted by the collimator lens 81 into the converged light and reflected by the polarizing beam splitter film 136a of the compound prism 136 as S-polarized light which then is partially reflected and partially transmitted by the half mirror 136b.

The reflected light is divided into the ±one order light, which has its focusing position extended only in the radial direction of traversing the track direction on the cylindrical lens 135c on the compound lens, and which has its focusing position shifted only in the tangential direction for detecting the focusing error signals by the spot size method by the hologram device 135d on the compound lens 95, and into the zero order light for detecting the RF signals, tracking error signals and the RF signals. The signals, so separated, are received by a photodetector 137.

The light transmitted through the half mirror 136b is totally reflected by a total reflecting surface 136b and has its focusing position adjusted by a concave lens 95e on the compound lens. The light then is separated by a split type hologram device 135g into the zero order light for detecting RF signals and ±one order light for detecting the DPD signals, so as to be collected on a photodetector 97.

Figure 23:
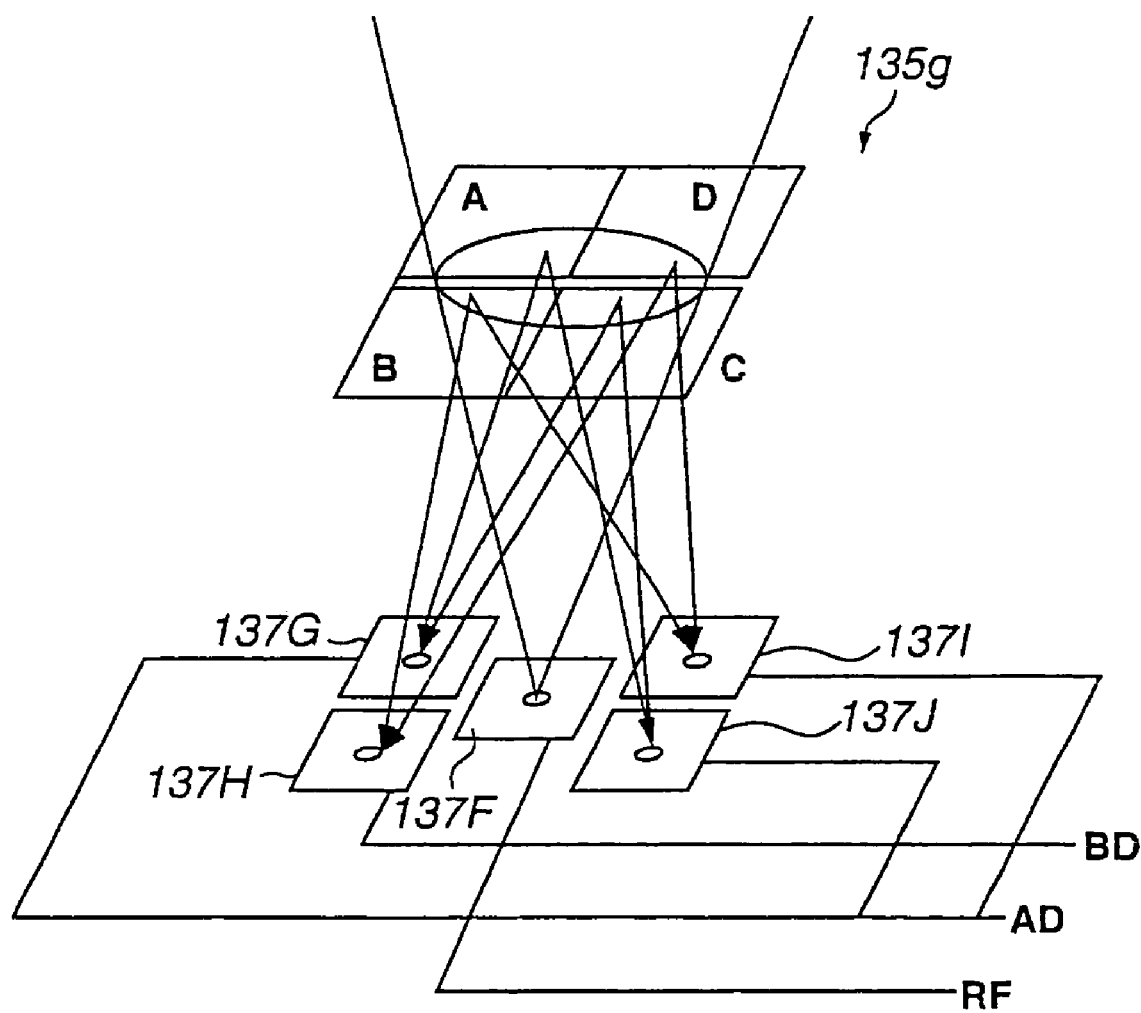
FIG. 23 is a perspective view showing a split type hologram device provided on the light receiving/emitting device shown in FIG. 22A.

An illustrative split type hologram device 135g, used in the light receiving/emitting device 130, shown in FIG. 22A, is now explained. This split type hologram device 135g is arranged as shown in FIG. 23. The light beams transmitted through the split areas A to D are received, in the combination shown in FIG. 23, by a light receiving section 137F for detecting RF signals and respective light receiving sections 137G, 137H, 137l and 137J for detecting the DPD signals. That is the one order light transmitted through the areas A, C of the split type hologram device 135g is received by the light receiving section 137G, whilst the –one order light transmitted through the areas B, D of the split type hologram device 135g is received by the light receiving section 137H. On the other hand, the +one order light transmitted through the areas B, D of the split type hologram device 135g is received by the light receiving section 137l, whilst the +one order light transmitted through the areas A, C of the split type hologram device 135g is received by the light receiving section 137J.

The respective signals, detected by the light receiving/emitting device 130, as described above, are as follows:

First, the focusing error signals, tracking error signals and the land-groove discrimination signals are detected by the same equation as that used for the light receiving/emitting device of the optical head by the light receiving sections 137A to 137E shown in FIG. 22B.

If an output of the light receiving section 137F for detecting the RF signals shown in FIG. 22 is RF, the RF signals may be detected by an equation RF signals=RF.

If the sum of outputs of the light receiving sections 137G and 137J for detecting the tracking signals by the DPD method shown in FIG. 22C is AC, and the sum of the outputs of the light receiving sections 137H, 137l is BD, the DPD signal may be detected by the equation of the phase difference signals of the DPD signal=outputs AC and outputs BD.

A light receiving/emitting device associated with a magneto-optical recording medium may also be realized by a structure substantially equivalent to that of the light receiving/emitting device 120 shown in FIG. 21.

FIGS. 24A to 24C show an illustrative light receiving/emitting device 141 in this case. The light receiving/emitting device 141 shown in FIG. 24A to 24C may be realized extremely readily by splitting into two spots (RF-MO) for photomagnetic detection instead of splitting into two beam spots for detecting the RF and DPD signals, and by optimizing film characteristics of the compound prism 236 for magneto-optical recording mediums.

Referring to FIGS. 24B and 24C, the light receiving sections 140A to 140E for servo signal detection of the photodetector 140 are configured similarly to the light receiving/emitting devices 120, 130 shown in FIGS. 21 and 22. As for the RF signals, the photodetector 140 has light receiving sections 140F and 140G for detecting the twp spots (RF-MO) described above.

With the light receiving/emitting device and the optical head employing the light receiving/emitting device, according to the present invention, it is possible to realize reduction in the number of component parts and the number of adjustment steps, a smaller size of the optical head, and reduction in cost.

If, in the integrated optical system, position shift is produced between the spot and the light receiving section on the photodetector due to manufacturing tolerance of component parts or variations in the assembling precision, there is produced no marked offset in the push-pull signals to assure stable signal detection. The result is that an optical arrangement which permits facilitated spot division or separation may be achieved without using strict manufacturing precision for component parts or assembling accuracy to an extent more than is necessary, thereby allowing to furnish an optical head and an optical recording medium recording and/or reproducing apparatus small in size and cost and having stabilized characteristics.

Moreover, the hologram device may be stronger against horizontal shifting by using such hologram device that has a larger power in the direction of focusing error detection than otherwise, while the lattice pitch of the hologram device may be smaller by improving symmetry in the shape of the spot for spot size detection. On the other hand, a light receiving/emitting device and an optical head suffering from defocusing or deterioration in characteristics against position shift between the light receiving sections and the spot only to a lesser extent may be realized since the spot for the TRK/CTS signal detection can be larger.

By transmission through the multiplication factor differential generating means, such as anamorphic prism, for both the forward and return paths, changes in characteristics of the tracking error/land-groove discrimination signals due to defocusing can be smaller, while the separation of the three spots on the photodetector can be larger, thus increasing the degree of freedom in designing.

The present invention is not limited to the above-described embodiments and may be modified without departing from the scope thereof.

For example, although a cylindrical lens or a toric lens is used as spot shape correcting means, it is also possible to use e.g., holograms having comparable effects. In such case, favorable effects similar to those of the embodiments described above can be achieved.

INDUSTRIAL APPLICABILITY

According to the present invention, described above, return spot shape correcting means are provided between an objective lens converging and illuminating a light beam on an optical recording medium and a photodetector and the beam spot diameter is corrected so that part or all of spots formed on the photodetector by the light beam reflected back from the optical recording medium is larger in diameter in the track traversing direction than in the direction extending along the track on the optical recording medium, so that no branching prism is required, while only one photodetector suffices, with the result that the number of component palls can be diminished and the adjustment process for the photodetector may be simplified, while the reduction in size and cost reduction are also realized.

What is claimed is:

1. A recording and/or reproducing apparatus for an optical recording medium comprising:
   means for rotationally driving an optical recording medium;
   an optical head for illuminating light via an objective lens supported for movement relative to a rotating optical recording medium and for detecting a light beam reflected from a signal recording surface of said optical recording medium through said objective lens by light detecting means;
   a signal processing circuit for generating playback signals based on detection signals from said light detecting means; and
   a servo circuit for causing movement of said objective lens based on said detection signals from said light detecting means;
   said optical head including:
      an objective lens supported for movement;
      a light source for radiating a light beam;
      light separating means for separating the light beam radiated from said light source and a reflected light beam from an optical recording medium from each other; light detecting means for receiving said reflected light beam from said optical recording medium separated by said light separating means; and
      spot shape correction means arranged between said objective lens and said light detecting means;
      said spot shape correction means correcting part or all of spots formed by said reflected light beam on said light detecting means so that the spot diameter in a direction of traversing a track on said optical recording medium will be larger than the spot diameter in a direction along said track,
      wherein said spot shape correction means includes a cylindrical lens.

2. The recording and/or reproducing apparatus for the optical recording medium according to claim 1 wherein said spot shape correction means corrects part or all of said spots formed by said reflected light beam on said light detecting means so that the spot diameter in a direction along the track on the optical recording medium will be approximately minimum.

3. The recording and/or reproducing apparatus for the optical recording medium according to claim 1 wherein said spot shape correction means includes a hologram device.

4. The recording and/or reproducing apparatus for the optical recording medium according to claim 1 wherein said spot shape correction means is unified to said light detecting means.

5. The recording and/or reproducing apparatus for the optical recording medium according to claim 1 wherein a hologram device for affording power to the diffracted light is provided between said light separating means and the light detecting means and wherein focusing error detection is performed by spot size detection.

6. The recording and/or reproducing apparatus for the optical recording medium according to claim 5 wherein said hologram device has a power to be afforded for the focusing error detection for the diffracted light larger than the power to be afforded in other directions.

7. The recording and/or reproducing apparatus for the optical recording medium according to claim 1 wherein said light detecting means for receiving said reflected light beam includes at least one set of light receiving sections, obtained on splitting, and wherein at least one of tracking error signals, address signals and clock signals is obtained by a push-pull method using said light receiving sections.

8. The recording and/or reproducing apparatus for the optical recording medium according to claim 1 wherein multiplication factor differential generating means is provided between said light separating means and said objective lens and wherein, by said multiplication factor differential generating means, the multiplication factor in the direction used for focusing error detection is set to be larger than the multiplication factor in other directions.

9. The recording and/or reproducing apparatus for the optical recording medium according to claim 8 wherein said multiplication factor differential generating means includes an anamorphic prism.

10. The recording and/or reproducing apparatus for the optical recording medium according to claim 1 wherein divergence angle converting means for converting an incident numerical aperture to said light separating means to a smaller value is provided between said light source of said optical head and the light separating means.

11. The recording and/or reproducing apparatus for the optical recording medium according to claim 10 wherein said divergence angle converting means includes a coupling lens.

12. A recording and/or reproducing apparatus for an optical recording medium comprising:
   means for rotationally driving said optical recording medium;
   an optical head for illuminating light through an objective lens supported for movement relative to a rotating optical recording medium and for detecting a light beam reflected from a signal recording surface of said optical recording medium through said objective lens by light detecting means;
   a signal processing circuit for generating playback signals based on detection signals from said light detecting means; and
   a servo circuit for causing movement of said objective lens based on said detection signals from said light detecting means;
   said optical head including:
      an objective lens supported for movement;
      a light source for radiating a light beam;
      light separating means for separating the light beam radiated from said light source and a reflected light beam from an optical recording medium from each other;
      light detecting means for receiving said reflected light beam from said optical recording medium separated by said light separating means; and spot shape correction means arranged between said objective lens and said light detecting means;

said spot shape correction means correcting part or all of spots formed by said reflected light beam on said light detecting means so that the spot diameter in a direction of traversing a track on said optical recording medium will be larger than the spot diameter in a direction along said track, wherein said spot shape correction means includes a toric lens.

13. The recording and/or reproducing apparatus for the optical recording medium according to claim 12 wherein said optical head comprises spot shape correction means for correcting part or all of said spots formed by said reflected light beam on said light detecting means so that the spot diameter in the direction along the track on the optical recording medium will be approximately minimum.

14. The recording and/or reproducing apparatus for the optical recording medium according to claim 12 wherein said spot shape correction means of said optical head includes a hologram device.

15. The recording and/or reproducing apparatus for the optical recording medium according to claim 12 wherein said light receiving/emitting device provides a hologram device for affording power to the diffracted light between said light separating means and the light detecting means and wherein focusing error detection is performed by spot size detection.

16. The recording and/or reproducing apparatus for the optical recording medium according to claim 15 wherein said hologram device has a power to be afforded for focusing error detection for the diffracted light larger than the power to be afforded in other directions.

17. The recording and/or reproducing apparatus for the optical recording medium according to claim 12 wherein said light detecting means for receiving said reflected light beam includes at least one set of light receiving sections, obtained on splitting, and wherein at least one of tracking error signals, address signals and clock signals is obtained by a push-pull method using said light receiving sections.

18. The recording and/or reproducing apparatus for the optical recording medium according to claim 12 wherein said light receiving/emitting device provides multiplication factor differential generating means between said light separating means and said objective lens in order to radiate a converged light beam on said optical recording medium, and wherein, by said multiplication factor differential generating means, the multiplication factor in the direction used for focusing error detection is larger than the multiplication factor in other directions.

19. The recording and/or reproducing apparatus for the optical recording medium according to claim 18 wherein said multiplication factor differential generating means includes an anamorphic prism.

20. The recording and/or reproducing apparatus for the optical recording medium according to claim 12 wherein said light receiving/emitting device provides divergence angle converting means for converting the incident numerical aperture to said light separating means to a smaller value between said light source and the light separating means.

21. The recording and/or reproducing apparatus for the optical recording medium according to claim 20 wherein said divergence angle converting means includes a coupling lens.

22. The recording and/or reproducing apparatus for the optical recording medium according to claim 12 wherein said light receiving/emitting device provides at least two optical paths from said light separating means to light detecting means and wherein focusing error detection and push-pull detection are performed on one of said optical paths and DPD detection is performed on the other optical path.

* * * * *

UNITED STATES PATENT AND TRADEMARK OFFICE
CERTIFICATE OF CORRECTION

| | | |
|---|---|---|
| PATENT NO. | : 7,319,644 B2 | Page 1 of 1 |
| APPLICATION NO. | : 11/494565 | |
| DATED | : January 15, 2008 | |
| INVENTOR(S) | : Noriaki Nishi | |

It is certified that error appears in the above-identified patent and that said Letters Patent is hereby corrected as shown below:

Title Page:
Item (63) should be read as follows:
-- Continuation of application No. 11/124,071, filed on May 9, 2005, now Pat. No. 7,095,687, which is a continuation of application No. 09/914,350, filed on Dec. 21, 2001, now Pat. No. 6,940,789, which is a 371 of PCT/JP2000/009327, filed on Dec. 27, 2000 --.

Signed and Sealed this

Tenth Day of June, 2008

JON W. DUDAS
*Director of the United States Patent and Trademark Office*